United States Patent
Smith et al.

(10) Patent No.: US 9,978,426 B2
(45) Date of Patent: May 22, 2018

(54) REPETITIVE-MOTION ACTIVITY ENHANCEMENT BASED UPON MEDIA CONTENT SELECTION

(71) Applicant: Spotify AB, Stockholm (SE)

(72) Inventors: Owen Smith, Stockholm (SE); Tristan Jehan, Brooklyn, NY (US); Sten Garmark, Stockholm (SE); Rahul Sen, Stockholm (SE)

(73) Assignee: Spotify AB, Stockholm (SE)

( * ) Notice: Subject to any disclaimer, the term of this patent is extended or adjusted under 35 U.S.C. 154(b) by 0 days. days.

(21) Appl. No.: 14/883,252

(22) Filed: Oct. 14, 2015

(65) Prior Publication Data

US 2016/0343410 A1  Nov. 24, 2016

Related U.S. Application Data

(60) Provisional application No. 62/163,910, filed on May 19, 2015.

(51) Int. Cl.
  *G11B 27/15*  (2006.01)
  *G11B 27/28*  (2006.01)

(52) U.S. Cl.
  CPC ............. *G11B 27/15* (2013.01); *G11B 27/28* (2013.01)

(58) Field of Classification Search
  CPC ....... G10H 2220/371; G10H 2240/131; G10H 2240/145; G06F 17/30743;
  (Continued)

(56) References Cited

U.S. PATENT DOCUMENTS 7,737,353 B2 * 6/2010 Sasaki ................ A63B 69/0028
  84/612
8,101,843 B2   1/2012 Turner
  (Continued)

FOREIGN PATENT DOCUMENTS

JP      02012022242 A   *  2/2012
WO    WO 2010/010830 A1  *  1/2010

OTHER PUBLICATIONS

Nishitani, Machine generated translation of JP02012022242A, dated Feb. 2012.*
  (Continued)

*Primary Examiner* — David Harvey
(74) *Attorney, Agent, or Firm* — Merchant & Gould P.C.

(57) ABSTRACT

Systems, devices, apparatuses, components, methods, and techniques for repetitive-motion activity enhancement based upon media content selection are provided. An example media-playback device for enhancement of a repetitive-motion activity includes a media-output device that plays media content items, a plurality of media content selection engines, and a repetitive-activity enhancement mode selection engine. The plurality of media content selection engines includes a cadence-based media content selection engine and an enhancement program engine. The cadence-based media content selection engine is configured to select media content items based on a cadence associated with the repetitive-motion activity. The enhancement program engine is configured to select media content items according to an enhancement program for the repetitive-motion activity. The repetitive-activity enhancement mode selection engine is configured to select a media content selection engine from the plurality of engines and to cause the media-output device to playback media content items selected by the selected engine.

22 Claims, 25 Drawing Sheets

(58) Field of Classification Search
CPC .......... G06F 17/30029; G09B 19/0038; H04N 21/42201; H04W 4/003; H04W 4/027
USPC ........................................................ 386/201
See application file for complete search history.

(56) References Cited

U.S. PATENT DOCUMENTS

| | | | |
|---|---|---|---|
| 8,254,829 B1* | 8/2012 | Kindred | G06F 17/30032 455/3.06 |
| 8,392,007 B1 | 3/2013 | Izo et al. | |
| 2005/0126370 A1* | 6/2005 | Takai | A63B 24/0003 84/636 |
| 2006/0107822 A1* | 5/2006 | Bowen | G10H 1/40 84/612 |
| 2006/0169125 A1* | 8/2006 | Ashkenazi | A63B 71/0686 84/612 |
| 2006/0288845 A1* | 12/2006 | Gale | G11B 27/322 84/609 |
| 2006/0288846 A1* | 12/2006 | Logan | A63B 71/0686 84/612 |
| 2007/0060446 A1 | 3/2007 | Asukai et al. | |
| 2007/0074617 A1* | 4/2007 | Vergo | G06F 17/30743 84/612 |
| 2007/0074618 A1* | 4/2007 | Vergo | G10H 1/00 84/612 |
| 2007/0074619 A1* | 4/2007 | Vergo | G10H 1/42 84/612 |
| 2007/0079691 A1* | 4/2007 | Turner | G10H 1/40 84/612 |
| 2007/0169614 A1 | 7/2007 | Sasaki et al. | |
| 2007/0203421 A1 | 8/2007 | Cho et al. | |
| 2007/0291958 A1* | 12/2007 | Jehan | G06N 99/005 381/103 |
| 2008/0096726 A1* | 4/2008 | Riley | A63B 24/0006 482/8 |
| 2008/0153671 A1 | 6/2008 | Ogg et al. | |
| 2008/0188354 A1* | 8/2008 | Pauws | A63B 71/0686 482/8 |
| 2009/0131224 A1* | 5/2009 | Yuen | A61B 5/0002 482/3 |
| 2009/0231964 A1* | 9/2009 | Kraft | G04G 13/02 368/250 |
| 2010/0031805 A1* | 2/2010 | Fratti | G10H 1/40 84/612 |
| 2010/0188405 A1* | 7/2010 | Haughay, Jr. | A63B 24/0062 345/440 |
| 2010/0210421 A1 | 8/2010 | Case, Jr. et al. | |
| 2010/0273610 A1* | 10/2010 | Johnson | H04M 1/72569 482/9 |
| 2011/0093100 A1* | 4/2011 | Ramsay | G06F 3/011 700/94 |
| 2012/0254907 A1* | 10/2012 | Serdiuk | A61B 5/0002 725/10 |
| 2013/0263049 A1* | 10/2013 | Lehtiniemi | G11B 27/034 715/810 |
| 2014/0180762 A1* | 6/2014 | Gilbert | G06Q 30/02 705/7.29 |
| 2014/0188638 A1* | 7/2014 | Jones | H04M 1/72569 705/16 |
| 2014/0222830 A1* | 8/2014 | Ringer | G06F 17/30041 707/748 |
| 2014/0338516 A1* | 11/2014 | Andri | G10H 1/40 84/612 |
| 2015/0081066 A1* | 3/2015 | Yeh | G06F 19/3406 700/94 |
| 2015/0142147 A1* | 5/2015 | Stanghed | G06F 17/30743 700/94 |
| 2015/0181314 A1* | 6/2015 | Swanson | H04Q 9/00 340/870.07 |

OTHER PUBLICATIONS

U.S. Appl. No. 14/883,340, filed Oct. 14, 2015 for "Cadence-Based Selection, Playback, and Transition Between Song Versions".
U.S. Appl. No. 14/883,245, filed Oct. 14, 2015 for "Heart Rate Control Based Upon Media Content Selection".
U.S. Appl. No. 14/883,232, filed Oct. 14, 2015 for "Cadence Determination and Media Content Selection".
U.S. Appl. No. 14/883,298, filed Oct. 14, 2015 for "Cadence-Based Playlists Management System".
U.S. Appl. No. 14/883,273, filed Oct. 14, 2015 for "Multi-Track Playback of Media Content During Repetitive Motion Activities".
U.S. Appl. No. 14/883,295, filed Oct. 14, 2015 for "Search Media Content Based Upon Tempo".
U.S. Appl. No. 14/883,318, filed Oct. 14, 2015 for "Cadence and Media Content Phase Alignment".
U.S. Appl. No. 14/944,972, filed Nov. 18, 2015 for "System for Managing Transitions Between Media Content Items".
U.S. Appl. No. 14/945,008, filed Nov. 18, 2015 for "Identifying Media Content".
U.S. Appl. No. 14/883,323, filed Oct. 14, 2015 for "Accessibility Management System or Media Content Items".
U.S. Appl. No. 14/883,336, filed Oct. 14, 2015 for "Selection and Playback of Song Versions Using Cadence".
The Echonest, "Analyzer Documentation", Version 3.2, Jan. 7, 2014, 7 pages.

* cited by examiner

REPETITIVE-MOTION ACTIVITY ENHANCEMENT BASED UPON MEDIA CONTENT SELECTION

CROSS-REFERENCE TO RELATED APPLICATION

This application claims priority to U.S. Ser. No. 62/163,910, filed May 19, 2015 entitled REPETITIVE-MOTION ACTIVITY ENHANCEMENT BASED UPON MEDIA CONTENT SELECTION, the disclosure of which is hereby incorporated by reference in its entirety.

BACKGROUND

Running, as well as many other recreation or fitness activities, include repetitive motions. For example, running and walking involve repetitive steps, biking involves repetitive rotational movements, rowing involves repetitive strokes, and swimming involves repetitive strokes and kicks. There are of course many other recreation and fitness activities that also include various repetitive motions. These repetitive motion activities may be performed in place (e.g., using a treadmill, stationary bike, rowing machine, swimming machine, etc.) or in motion (e.g., on roads, trails, or tracks or in a pool or body of water, etc.). Cadence refers to the frequency of these repetitive motions and is often measured in terms of motions per minute (e.g., steps per minute, rotations per minute, strokes per minute, or kicks per minute).

Many people enjoy consuming media content, such as listening to audio content or watching video content, while running or engaging in other repetitive-motion activities. Examples of audio content include songs, albums, podcasts, audiobooks, etc. Examples of video content include movies, music videos, television episodes, etc. Using a mobile phone or other media-playback device a person can access large catalogs of media content. For example, a user can access an almost limitless catalog of media content through various free and subscription-based streaming services. Additionally, a user can store a large catalog of media content on his or her mobile device.

This nearly limitless access to media content introduces new challenges for users. For example, it may be difficult to find or select the right media content that complements a particular moment during a run or other repetitive-motion activity.

SUMMARY

In general terms, this disclosure is directed to repetitive-motion activity enhancement based upon media content selection. In one possible configuration and by non-limiting example, a media-playback device operates in multiple modes to select media content for playback during a repetitive-motion activity. Various aspects are described in this disclosure, which include, but are not limited to, the following aspects.

In one aspect, a media-playback device for enhancement of a repetitive-motion activity, the media playback device comprising: a media-output device that plays media content items; a plurality of media content selection engines, wherein the plurality of media content selection engines comprises: a cadence-based media content selection engine configured to select media content items based on a cadence associated with the repetitive-motion activity; and an enhancement program engine configured to select a media content items according to an enhancement program for the repetitive-motion activity; and a repetitive-activity enhancement mode selection engine configured to select a media content selection engine from the plurality of engines and to cause the media-output device to playback media content items selected by the selected engine.

In another aspect, a method of selecting media content to enhance a repetitive-motion activity according to an enhancement program comprising: selecting a media content item for playback based on a tempo defined by a first segment of the enhancement program; monitoring the repetitive-motion activity to determine whether the first segment is complete; and upon determining that the first segment is complete, selecting a second media content item for playback based on a tempo defined by a second segment of the enhancement program.

In yet another aspect, a mobile device for enhancement of a repetitive-motion activity, the mobile device comprising: a media-output device that plays media content items; a cadence-acquiring device comprising an accelerometer and a cadence-determination engine configured to determine a cadence based on acceleration data captured by the accelerometer; a plurality of media content selection engines, wherein the plurality of media content selection engines comprises: a cadence-based media content selection engine configured to select media content items based on a cadence determined by the cadence-acquiring device; an enhancement program engine configured to select a media content items according to an enhancement program for the repetitive-motion activity; and a physiological control engine configured to select media content items based on a physiological measurement; a repetitive-activity enhancement mode selection engine configured to select a media content selection engine from the plurality of engines and to cause the media-output device to playback media content items selected by the selected engine; and a media content alignment engine that operates to align consecutive playback of media content items.

DETAILED DESCRIPTION

Figure 1:
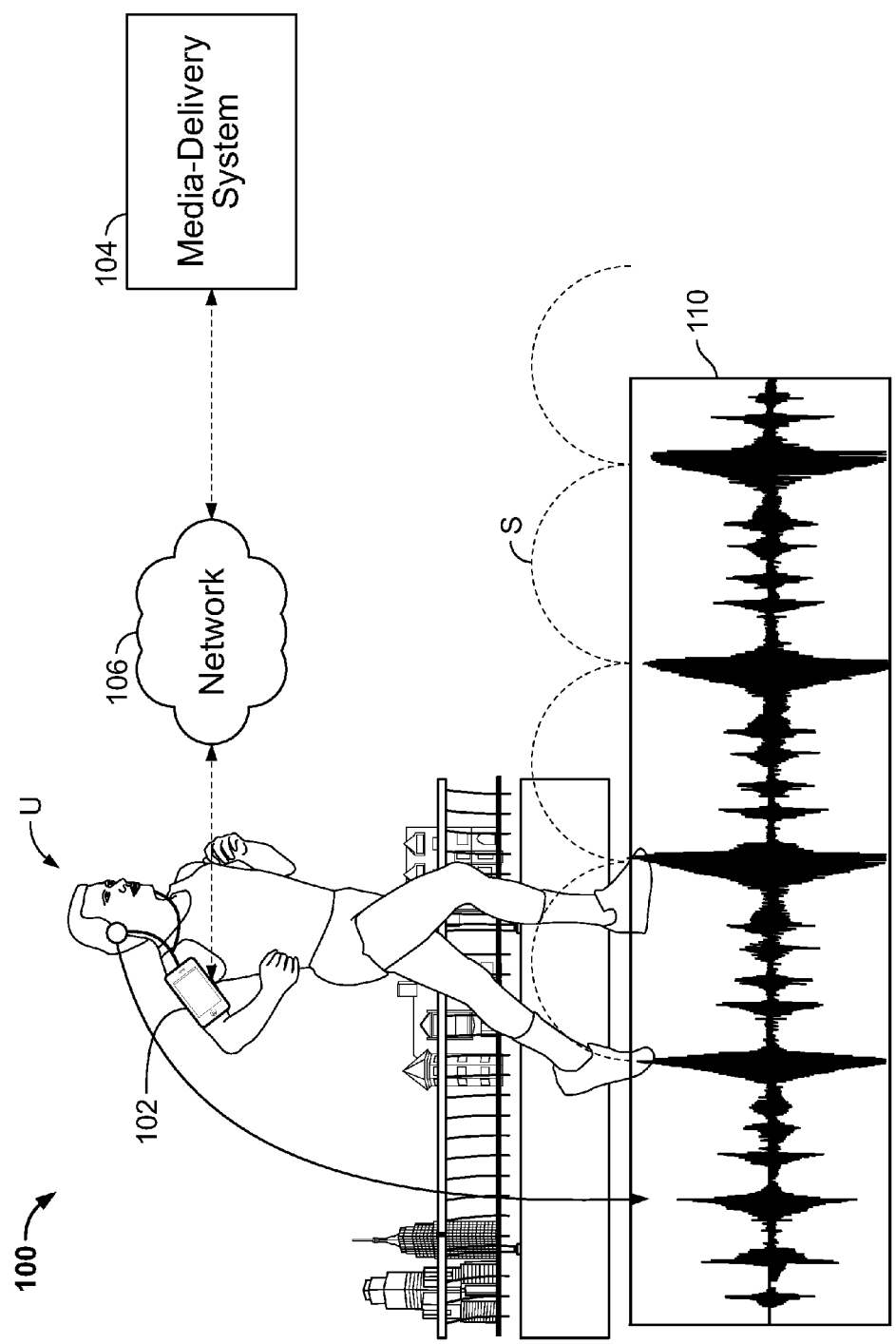
FIG. 1 illustrates an example system for cadence determination and media content selection.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Users of media-playback devices often consume media content while engaging in various activities, including repetitive motion activities. As noted above, examples of repetitive-motion activities may include swimming, biking, running, rowing, and other activities. Consuming media content may include one or more of listening to audio content, watching video content, or consuming other types of media content. For ease of explanation, the embodiments described in this application are presented using specific examples. For example, audio content (and in particular music) is described as an example of one form of media consumption. As another example, running is described as one example of a repetitive-motion activity. However, it should be understood that the same concepts are equally applicable to other forms of media consumption and to other forms of repetitive-motion activities, and at least some embodiments include other forms of media consumption and/or other forms of repetitive-motion activities.

The users may desire that the media content fits well with the particular repetitive-motion activity. For example, a user who is running may desire to listen to music with a beat that corresponds to the user's cadence. Beneficially, by matching the beat of the music to the cadence, the user's performance or enjoyment of the repetitive-motion activity may be enhanced. This desire cannot be met with traditional media-playback devices and media-delivery systems.

The systems and methods described herein operate to enhance a repetitive-motion activity through the playback of media content in various ways. For example the playback of media content may enhance a repetitive-motion activity by increasing a user's performance or enjoyment of the activity. The systems described herein provide various modes and programs so that user may select a preferred mode of enhancement for a repetitive motion activity.

FIG. 1 illustrates an example system 100 for cadence determination and media content selection. The example system 100 includes a media-playback device 102 and a media-delivery system 104. The system 100 communicates across a network 106. Also shown, is a user U who is running. The user U's upcoming steps S are shown as well. A step represents a single strike of the runner's foot upon the ground.

The media-playback device 102 operates to play media content items to produce media output 110. In some embodiments, the media content items are provided by the media-delivery system 104 and transmitted to the media-playback device 102 using the network 106. A media content item is an item of media content, including audio, video, or other types of media content, which may be stored in any format suitable for storing media content. Non-limiting examples of media content items include songs, albums, music videos, movies, television episodes, podcasts, other types of audio or video content, and portions or combinations thereof.

The media-playback device 102 plays media content for the user based on the user's cadence. In the example shown, the media output 110 includes music with a tempo that corresponds to the user's cadence. The tempo (or rhythm) of music refers to the frequency of the beat and is typically measured in beats per minute (BPM). The beat is the basic unit of rhythm in a musical composition (as determined by the time signature of the music). Accordingly, in the example shown, the user U's steps occur at the same frequency as the beat of the music.

For example, if the user U is running at a cadence of 180 steps per minute, the media-playback device 102 may play a media content item having a tempo equal to or approximately equal to 180 BPM. In other embodiments, the media-playback device 102 plays a media content item having a tempo equal or approximately equal to the result of dividing the cadence by an integer such as a tempo that is equal to or approximately equal to one-half (e.g., 90 BPM when the user is running at a cadence of 180 steps per minute), one-third, one-fourth, or one-eighth of the cadence.

Alternatively, the media-playback device 102 plays a media content item having a tempo that is equal or approximately equal to an integer multiple (e.g., 2×, 3×, 4×, etc.) of the cadence. Further, in some embodiments, the media-playback device 102 operates to play multiple media content items including one or more media content items having a tempo equal to or approximately equal to the cadence and one or more media content items have a tempo equal or approximately equal to the result of dividing the cadence by an integer. Various other combinations are possible as well.

In some embodiments, the media-playback device 102 operates to play music having a tempo that is within a predetermined range of a target tempo. In at least some embodiments, the predetermined range is five BPM. For example, if the user U is running at a cadence of 180 steps per minute, the media-playback device 102 operates to play music having a tempo of 175-185 BPM. Alternatively, in other embodiments, the predetermined range is itself in a range from 1 BPM to 10 BPM.

Further, in some embodiments, the media-playback device 102 operates to play music having a tempo equal to or approximately equal to a user U's cadence after it is rounded. For example, the cadence may be rounded to the nearest multiple of 2.5, 5, or 10 and then the media-playback device 102 plays music having a tempo equal to or approximately equal to the rounded cadence. In yet other embodiments, the media-playback device 102 uses the cadence to select a predetermined tempo range of music for playback. For example, if the user U's cadence is 181 steps per minute, the media-playback device 102 may operate to play music from a predetermined tempo range of 180-184.9 BPM; while if the user U's cadence is 178 steps per minute, the media-playback device 102 may operate to play music from a predetermined tempo range of 175-179.9 BPM.

Figure 2:
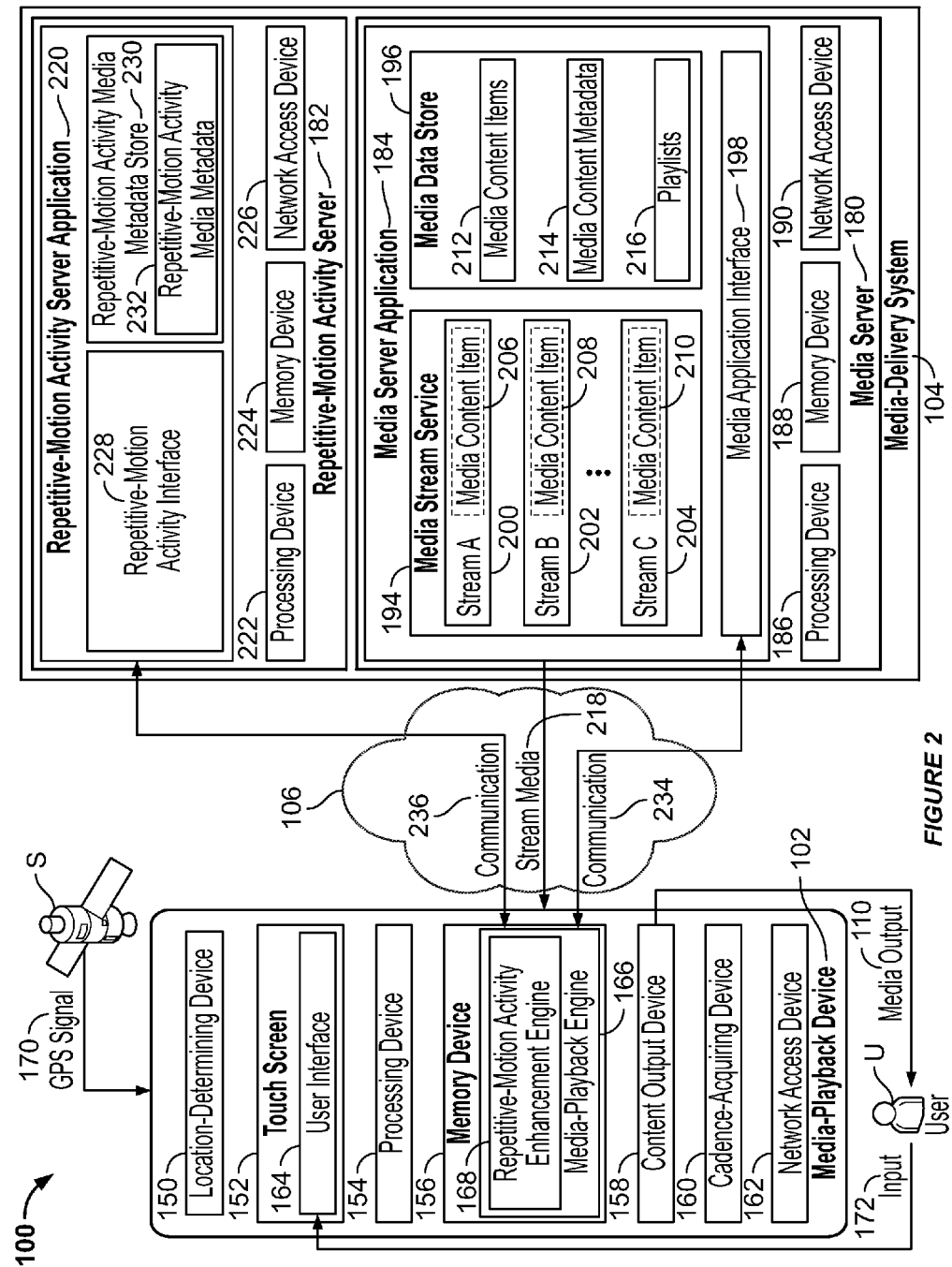
FIG. 2 is a schematic illustration of the example system of FIG. 1.

FIG. 2 is a schematic illustration of an example system 100 for cadence determination and media content selection. In FIG. 2, the media-playback device 102, the media-delivery system 104, and the network 106 are shown. Also shown are the user U and a satellite S.

As noted above, the media-playback device 102 operates to play media content items. In some embodiments, the media-playback device 102 operates to play media content items that are provided (e.g., streamed, transmitted, etc.) by a system external to the media-playback device such as the media-delivery system 104, another system, or a peer device. Alternatively, in some embodiments, the media-playback device 102 operates to play media content items stored locally on the media-playback device 102. Further, in at least some embodiments, the media-playback device 102 operates to play media content items that are stored locally as well as media content items provided by other systems.

In some embodiments, the media-playback device 102 is a computing device, handheld entertainment device, smartphone, tablet, watch, wearable device, or any other type of device capable of playing media content. In yet other embodiments, the media-playback device 102 is a laptop computer, desktop computer, television, gaming console, set-top box, network appliance, blue-ray or DVD player, media player, stereo, or radio.

In at least some embodiments, the media-playback device 102 includes a location-determining device 150, a touch screen 152, a processing device 154, a memory device 156, a content output device 158, a cadence-acquiring device 160, and a network access device 162. Other embodiments may include additional, different, or fewer components. For example, some embodiments may include a recording device such as a microphone or camera that operates to record audio or video content. As another example, some embodiments do not include one or more of the location-determining device 150 and the touch screen 152.

The location-determining device 150 is a device that determines the location of the media-playback device 102. In some embodiments, the location-determining device 150 uses one or more of the following technologies: Global Positioning System (GPS) technology which may receive GPS signals 170 from satellites S, cellular triangulation technology, network-based location identification technology, Wi-Fi positioning systems technology, and combinations thereof.

The touch screen 152 operates to receive an input 172 from a selector (e.g., a finger, stylus etc.) controlled by the user U. In some embodiments, the touch screen 152 operates as both a display device and a user input device. In some embodiments, the touch screen 152 detects inputs based on one or both of touches and near-touches. In some embodiments, the touch screen 152 displays a user interface 164 for interacting with the media-playback device 102. As noted above, some embodiments do not include a touch screen 152. Some embodiments include a display device and one or more separate user interface devices. Further, some embodiments do not include a display device.

In some embodiments, the processing device 154 comprises one or more central processing units (CPU). In other embodiments, the processing device 154 additionally or alternatively includes one or more digital signal processors, field-programmable gate arrays, or other electronic circuits.

The memory device 156 operates to store data and instructions. In some embodiments, the memory device 156 stores instructions for a media-playback engine 166 that includes a repetitive-motion activity enhancement engine 168. In some embodiments, the media-playback engine 166 operates to playback media content and the repetitive-motion activity enhancement engine 168 operates to select media content for playback to enhance a repetitive-motion activity.

The memory device 156 typically includes at least some form of computer-readable media. Computer readable media includes any available media that can be accessed by the media-playback device 102. By way of example, computer-readable media include computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, blue ray discs, digital versatile discs or other optical storage, magnetic cassettes, magnetic tape, magnetic disk storage or other magnetic storage devices, or any other medium that can be used to store the desired information and that can be accessed by the media-playback device 102. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The content output device 158 operates to output media content. In some embodiments, the content output device 158 generates media output 110 for the user U. Examples of the content output device 158 include a speaker, an audio output jack, a Bluetooth transmitter, a display panel, and a video output jack. Other embodiments are possible as well. For example, the content output device 158 may transmit a signal through the audio output jack or Bluetooth transmitter that can be used to reproduce an audio signal by a connected or paired device such as headphones or a speaker.

The cadence-acquiring device 160 operates to acquire a cadence associated with the user U. In at least some embodiments, the cadence-acquiring device 160 operates to determine cadence directly and includes one or more accelerometers or other motion-detecting technologies. Alternatively, the cadence-acquiring device 160 operates to receive data representing a cadence associated with the user U. For example, in some embodiments, the cadence-acquiring device 160 operates to receive data from a watch, bracelet, foot pod, chest strap, shoe insert, anklet, smart sock, bicycle computer, exercise equipment (e.g., treadmill, rowing machine, stationary cycle), or other device for determining or measuring cadence. Further, in some embodiments, the cadence-acquiring device 160 operates to receive a cadence value input by the user U or another person.

The network access device 162 operates to communicate with other computing devices over one or more networks, such as the network 106. Examples of the network access device include wired network interfaces and wireless network interfaces. Wireless network interfaces includes infrared, BLUETOOTH® wireless technology, 802.11a/b/g/n/ac, and cellular or other radio frequency interfaces in at least some possible embodiments.

The network 106 is an electronic communication network that facilitates communication between the media-playback device 102 and the media-delivery system 104. An electronic communication network includes a set of computing devices and links between the computing devices. The computing devices in the network use the links to enable communication among the computing devices in the network. The network 106 can include routers, switches, mobile access points, bridges, hubs, intrusion detection devices, storage devices, standalone server devices, blade server devices, sensors, desktop computers, firewall devices, laptop computers, handheld computers, mobile telephones, and other types of computing devices.

In various embodiments, the network 106 includes various types of links. For example, the network 106 can include wired and/or wireless links, including Bluetooth, ultrawideband (UWB), 802.11, ZigBee, cellular, and other types of wireless links. Furthermore, in various embodiments, the network 106 is implemented at various scales. For example, the network 106 can be implemented as one or more local area networks (LANs), metropolitan area networks, subnets, wide area networks (such as the Internet), or can be implemented at another scale. Further, in some embodiments, the network 106 includes multiple networks, which may be of the same type or of multiple different types.

The media-delivery system 104 comprises one or more computing devices and operates to provide media content items to the media-playback devices 102 and, in some embodiments, other media-playback devices as well. The media-delivery system 104 includes a media server 180 and a repetitive-motion activity server 182. In at least some embodiments, the media server 180 and the repetitive-motion activity server 182 are provided by separate computing devices. In other embodiments, the media server 180 and the repetitive-motion activity server 182 are provided by the same computing devices. Further, in some embodiments, one or both of the media server 180 and the repetitive-motion activity server 182 are provided by multiple computing devices. For example, the media server 180 and the repetitive-motion activity server 182 may be provided by multiple redundant servers located in multiple geographic locations.

The media server 180 operates to transmit stream media 218 to media-playback devices such as the media-playback device 102. In some embodiments, the media server 180 includes a media server application 184, a processing device 186, a memory device 188, and a network access device 190. The processing device 186, memory device 188, and network access device 190 may be similar to the processing device 154, memory device 156, and network access device 162 respectively, which have each been previously described.

In some embodiments, the media server application 184 operates to stream music or other audio, video, or other forms of media content. The media server application 184 includes a media stream service 194, a media data store 196, and a media application interface 198. The media stream service 194 operates to buffer media content such as media content items 206, 208, and 210, for streaming to one or more streams 200, 202, and 204.

The media application interface 198 can receive requests or other communication from media-playback devices or other systems, to retrieve media content items from the media server 180. For example, in FIG. 2, the media application interface 198 receives communication 234 from the media-playback engine 166.

In some embodiments, the media data store 196 stores media content items 212, media content metadata 214, and playlists 216. The media data store 196 may comprise one or more databases and file systems. Other embodiments are possible as well. As noted above, the media content items 212 may be audio, video, or any other type of media content, which may be stored in any format for storing media content.

The media content metadata 214 operates to provide various information associated with the media content items 212. In some embodiments, the media content metadata 214 includes one or more of title, artist name, album name, length, genre, mood, era, etc. The playlists 216 operate to identify one or more of the media content items 212 and. In some embodiments, the playlists 216 identify a group of the media content items 212 in a particular order. In other embodiments, the playlists 216 merely identify a group of the media content items 212 without specifying a particular order. Some, but not necessarily all, of the media content items 212 included in a particular one of the playlists 216 are associated with a common characteristic such as a common genre, mood, or era.

The repetitive-motion activity server 182 operates to provide repetitive-motion activity-specific information about media content items to media-playback devices. In some embodiments, the repetitive-motion activity server 182 includes a repetitive-motion activity server application 220, a processing device 222, a memory device 224, and a network access device 226. The processing device 222, memory device 224, and network access device 226 may be similar to the processing device 154, memory device 156, and network access device 162 respectively, which have each been previously described.

In some embodiments, repetitive-motion activity server application 220 operates to transmit information about the suitability of one or more media content items for playback during a particular repetitive-motion activity. The repetitive-motion activity server application 220 includes a repetitive-motion activity interface 228 and a repetitive-motion activity media metadata store 230.

In some embodiments, the repetitive-motion activity server application 220 may provide a list of media content items at a particular tempo to a media-playback device in response to a request that includes a particular cadence value. Further, in some embodiments, the media content items included in the returned list will be particularly relevant for the repetitive motion activity in which the user is engaged (for example, if the user is running, the returned list of media content items may include only media content items that have been identified as being highly runnable).

The repetitive-motion activity interface 228 operates to receive requests or other communication from media-playback devices or other systems to retrieve information about media content items from the repetitive-motion activity server 182. For example, in FIG. 2, the repetitive-motion activity interface 228 receives communication 236 from the media-playback engine 166.

In some embodiments, the repetitive-motion activity media metadata store 230 stores repetitive-motion activity media metadata 232. The repetitive-motion activity media metadata store 230 may comprise one or more databases and file systems. Other embodiments are possible as well.

The repetitive-motion activity media metadata 232 operates to provide various information associated with media content items, such as the media content items 212. In some embodiments, the repetitive-motion activity media metadata 232 provides information that may be useful for selecting media content items for playback during a repetitive-motion activity. For example, in some embodiments, the repetitive-motion activity media metadata 232 stores runnability scores for media content items that correspond to the suitability of particular media content items for playback during running. As another example, in some embodiments, the repetitive-motion activity media metadata 232 stores timestamps (e.g., start and end points) that identify portions of a media content items that are particularly well-suited for playback during running (or another repetitive-motion activity).

Each of the media-playback device 102 and the media-delivery system 104 can include additional physical computer or hardware resources. In at least some embodiments, the media-playback device 102 communicates with the media-delivery system 104 via the network 106.

Although in FIG. 2 only a single media-playback device 102 and media-delivery system 104 are shown, in accordance with some embodiments, the media-delivery system 104 can support the simultaneous use of multiple media-playback devices, and the media-playback device can simultaneously access media content from multiple media-delivery systems. Additionally, although FIG. 2 illustrates a streaming media based system for cadence determination and media content selection, other embodiments are possible as well. For example, in some embodiments, the media-playback device 102 includes a media data store 196 and the media-playback device 102 is configured to perform cadence determination and media content selection without accessing the media-delivery system 104. Further in some embodiments, the media-playback device 102 operates to store previously streamed media content items in a local media data store.

In at least some embodiments, the media-delivery system 104 can be used to stream, progressively download, or otherwise communicate music, other audio, video, or other forms of media content items to the media-playback device 102 based on a cadence acquired by the cadence-acquiring device 160 of the media-playback device 102. In accordance with an embodiment, a user U can direct the input 172 to the user interface 164 to issue requests, for example, to playback media content corresponding to the cadence of a repetitive motion activity on the media-playback device 102.

Figure 3:
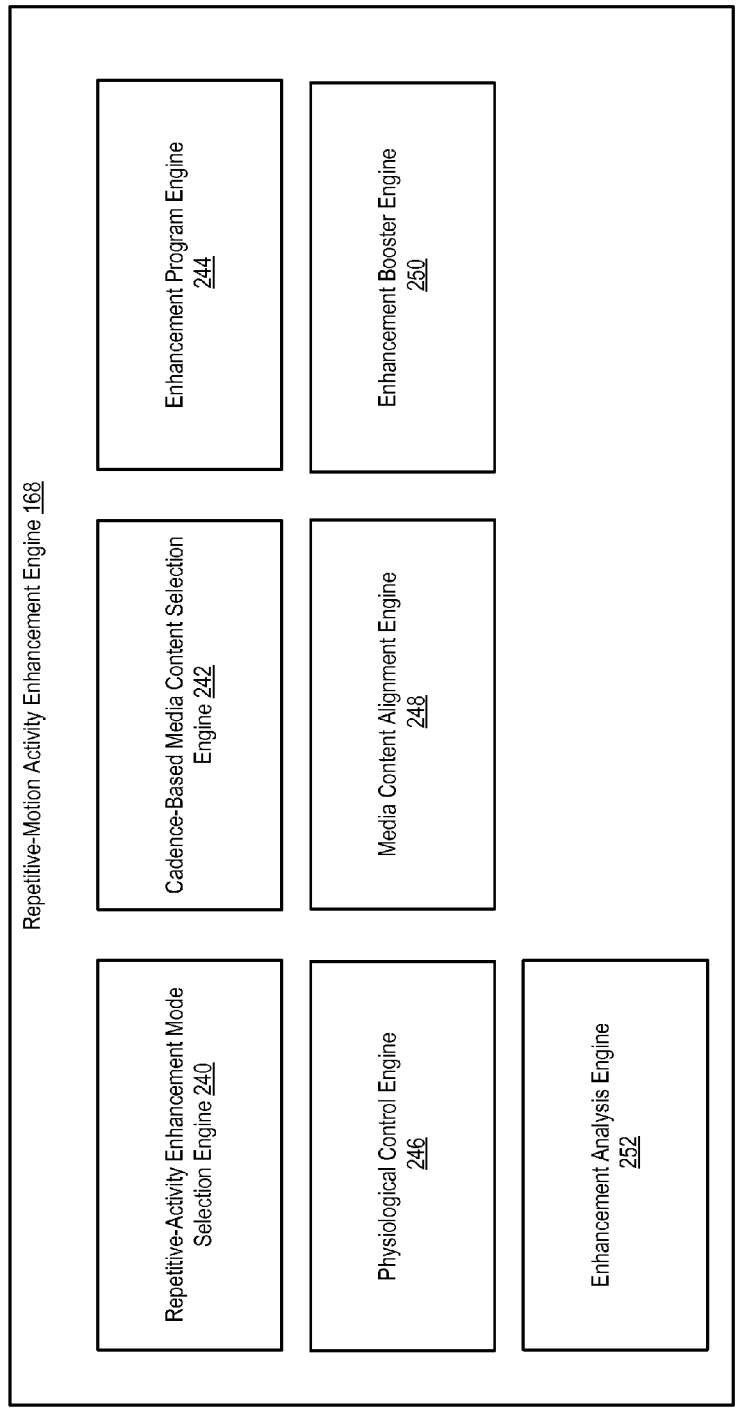
FIG. 3 is a schematic block diagram of the repetitive-motion activity enhancement engine of FIG. 2.

FIG. 3 is a schematic block diagram of the repetitive-motion activity enhancement engine 168. In some embodiments, repetitive-motion activity enhancement engine 168 includes a repetitive-motion activity enhancement mode selection engine 240, a cadence-based media content selection engine 242, an enhancement program engine 244, a physiological control engine 246, a media content alignment engine 248, an enhancement booster engine 250, and an enhancement analysis engine 252.

The repetitive-motion activity enhancement mode selection engine 240 operates to present interfaces and receive inputs from users to control the mode of operation of the repetitive-motion activity enhancement engine 168. Example methods performed by some embodiments of the repetitive-motion activity enhancement mode selection engine 240 are illustrated and described with respect to at least FIG. 4.

The cadence-based media content selection engine 242 operates to select media content for playback based on a cadence. Example methods performed by some embodiments of the cadence-based media content selection engine 242 are illustrated and described with respect to at least FIG. 5.

The enhancement program engine 244 operates to monitor a repetitive-activity and playback media content item according to a selected enhancement program. Example methods performed by some embodiments of the enhancement program engine 244 are illustrated and described with respect to at least FIG. 10.

The physiological control engine 246 operates to select media content for playback based on various conditions, such as physiological measurements like heart rate, etc. and/or current location. Example methods performed by some embodiments of the physiological control engine 246 are illustrated and described with respect to at least FIGS. 11-14. The media content alignment engine 248 operates to align playback of consecutive media content items.

The enhancement booster engine 250 operates to analyze a repetitive-motion activity to identify times a user may benefit from additional enhancement. In some embodiments, the enhancement booster engine 250 also operates to playback one or more media content items in response to determining that additional enhancement may be needed to provide an enhancement boost. As an example, the enhancement booster engine 250 may operate to monitor a user who is out for a long run and detect that the user has begun to lose speed, is approaching or traversing a big hill, etc. In response, the enhancement booster engine 250 may operate to playback a media content item that the user may find to be motivating (e.g., the song Eye of the Tiger by Survivor) as an enhancement booster to help the user to regain energy. In some embodiments, the enhancement booster engine 250 immediately transitions to the enhancement-boosting media content item. In other embodiments, the enhancement booster engine 250 transitions to the enhancement-boosting media content item after some delay such as to allow the currently playing media content item to complete. Beneficially, by delaying playback, the transition to the enhancement-boosting media content item may feel more natural to the user.

The enhancement analysis engine 252 operates to monitor repetitive-motion activities. In some embodiments, the enhancement analysis engine 252 also operates to calculate an enhancement effectiveness score for one or more media content items. The enhancement effectiveness score may represent how well a particular media content item enhances a particular repetitive-motion activity. In some embodiments, the enhancement effectiveness score is used to select media content items for repetitive-motion activity enhancement.

Figure 4:
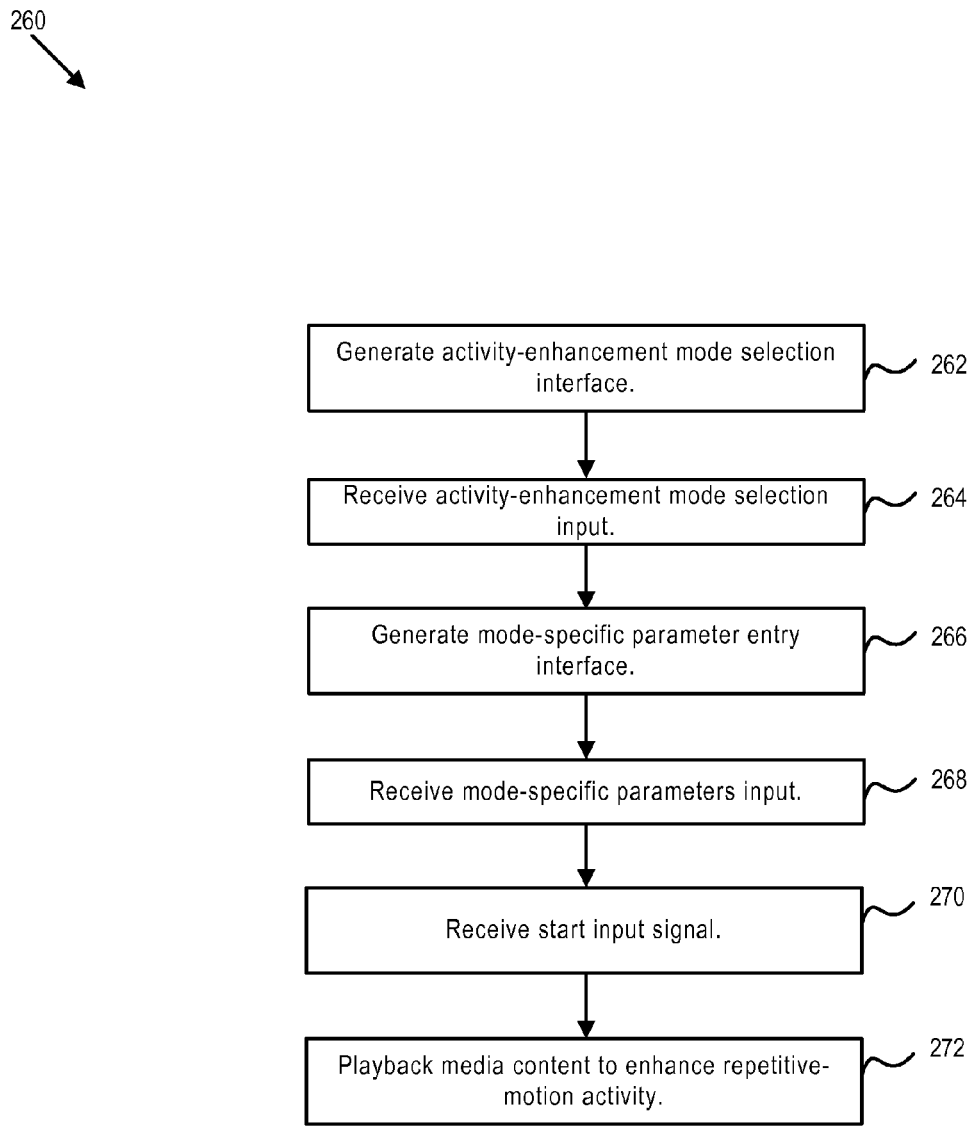
FIG. 4 illustrates an example method of repetitive-motion activity enhancement performed by some embodiments of the media-playback device of FIG. 1.

FIG. 4 illustrates an example method 260 of repetitive-motion activity enhancement performed by some embodiments of the media-playback device 102.

At operation 254, an activity enhancement mode selection interface is generated. The activity enhancement mode selection interface operates to present one or more modes of operation to the user. In some embodiments, the enhancement mode selection interface is a graphical menu that lists available modes. In other embodiments, the activity enhancement mode selection interface is an audio interface that audibly presents the modes to a user.

Example modes of operation include a cadence-based selection mode, a programmed mode, and a physiological measurement mode. Some embodiments include additional, different, or fewer modes. In some embodiments, the cadence-based mode operates to determine a cadence of a repetitive-motion activity and playback media content with a corresponding tempo (i.e., the media content follows the cadence of the activity). In some embodiments, the programmed mode operates to playback music having a tempo corresponding to one or more goal cadences defined over a program for the repetitive-motion activity (i.e., the media content leads or guides the cadence of the activity). An example program includes a single cadence value for the duration of the repetitive-motion activity. Another example program includes multiple segments and each segment may define a different target cadence. An intervals program is an example program with multiple segments. An example intervals program includes multiple segments with alternating segment values. Additionally, some programs include segments for warmup, cool down, etc. In some embodiments, the physiological measurement mode operates to acquire one or more physiological measurements (e.g., heart rate) and to determine a target cadence (and therefore corresponding media content) at least in part based on the acquired physiological measurements. Additionally, some embodiments include modes that combine aspects of the previously discussed modes. For example, some embodiments include a mode that specifies one or more segments in terms of target values for a physiological measurements and operates to playback media content at least in part to influence the physiological measurement.

At operation 264, an activity-enhancement mode selection input is received. In some embodiments, the selection is received as a touch input from a selector on the touch screen 152. In other embodiments, the selection is received as a button press or mouse click. In yet other embodiments, the selection is received as a movement of the user (e.g., a hand wave or a jump) or of the media-playback device 102 (e.g., a rotation or shaking of the media-playback device 102).

At operation 266, a mode-specific parameter entry interface is generated. The mode-specific parameter entry interface operates to present one or more parameters to the user. In some embodiments, the parameters that are presented are specific to the mode input received in operation 264. Example parameters include a program selection, a target cadence, a target physiological measurement, and a playlist selection. Other parameters besides those discussed above are presented in some embodiments and in some embodiments not all of the parameters discussed above are presented in all (or even any) of the modes. Although, operation 266 refers to mode-specific parameters, in some embodiments, one or more parameters are presented in multiple modes. In some embodiments, the same set of parameters is presented in multiple modes as well.

At operation 268, mode-specific parameters input is received. Examples of receiving inputs are discussed at least with respect to operation 264. In some embodiments, playback of media content begins after the mode-specific parameters are received without requiring further input (i.e., the method 260 skips the operation 270). Additionally, in some embodiments, depending on the mode selected in operation 264, operations 266 and 268 are not performed. For example, in some embodiments, the cadence-based selection mode does not require any additional parameters and operations 266 and 268 are not performed.

At operation 270, a start input signal is received by the media-playback device 102. Various embodiments operate to receive various start input signals. Example start input signals include a touch input from a selector on a particular location on the user interface 164 (e.g., a start button), a spoken command captured by a microphone or otherwise, or a movement that is detected by the media-playback device 102 such as the user beginning to run while holding the media-playback device 102.

At operation 272, media content is played back to enhance a repetitive-motion activity based on the mode selection received in operation 264 and the mode-specific parameters received at operation 268. Various examples of enhancing repetitive-motion activities with media content playback are discussed herein.

Figure 5:
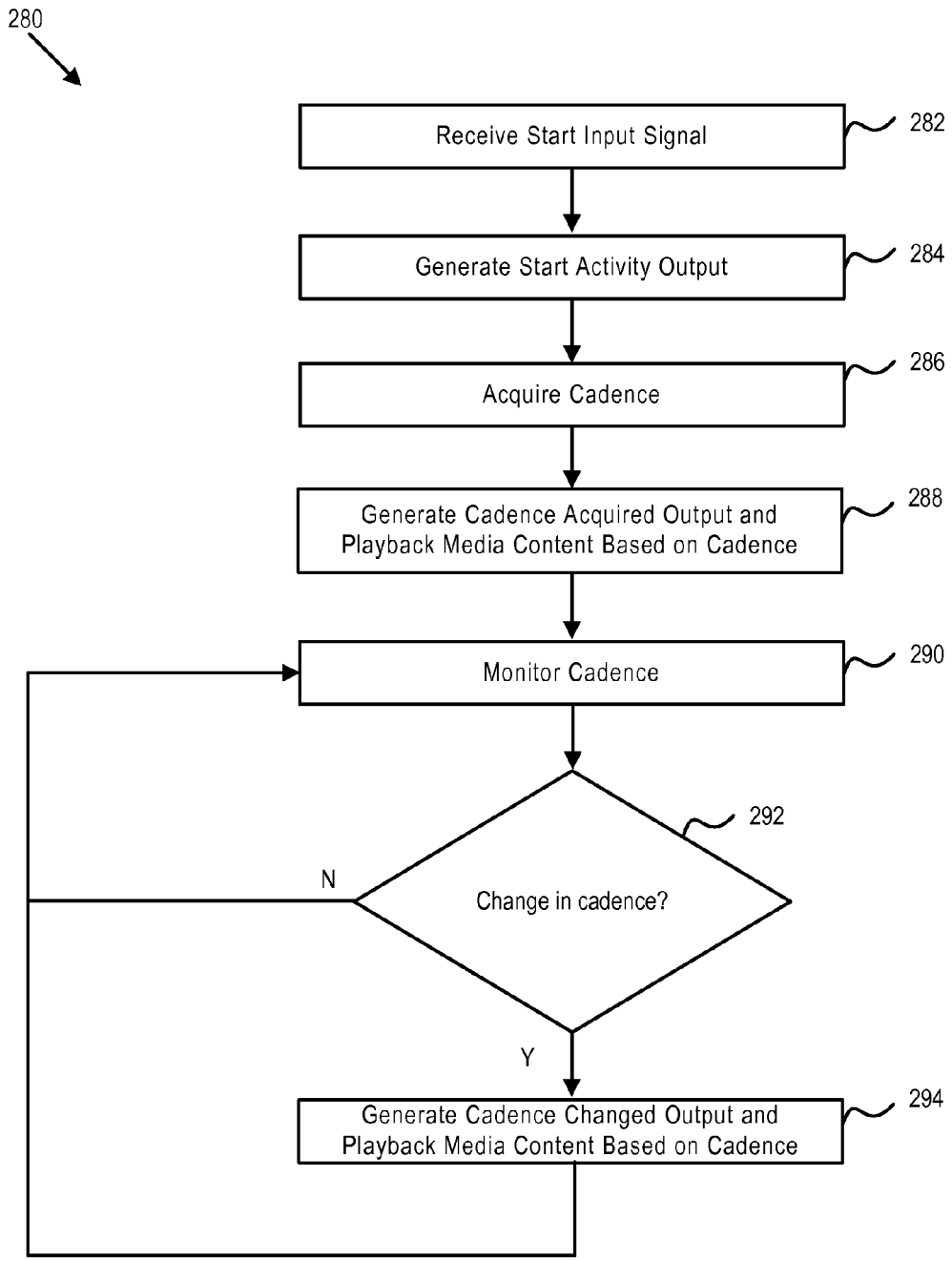
FIG. 5 illustrates an example method of cadence monitoring and media content selection performed by some embodiments of the media-playback device of FIG. 1.

FIG. 5 illustrates an example method 280 of cadence monitoring and media content selection performed by some embodiments of the media-playback device 102. The method 280 is one example of operation 272 (playing back media content to enhance a repetitive-motion activity) that is performed by some embodiments depending on the mode a user selects.

At operation 282, a start input signal is received by the media-playback device 102. In some embodiments, operation 282 is similar to operation 270, which is illustrated and described with respect to at least FIG. 4.

At operation 284, a start activity output is generated. Various embodiments generate one or more start activity outputs. Examples of start activity outputs include generation of audible signals such as beeps, bells, sound effects, pre-recorded voiceovers (e.g., "Go," "Start Running," or "Start Activity"), etc. Other examples of start activity outputs include visual indicators on the user interface 164.

At operation 286, a cadence associated with a repetitive-motion activity of the user is acquired. In some embodiments, the cadence is acquired by determining the cadence based on movements of the media-playback device 102 (e.g., using the methods illustrated and described with respect to at least FIGS. 5-9). In other embodiments, the cadence is acquired from a separate device, from a user input, or otherwise. Regardless of how the cadence is acquired, once that cadence is acquired, the method 280 continues to operation 288.

At operation 288, a cadence acquired output is generated. Various embodiments generate one or more cadence acquired outputs. Examples of cadence acquired outputs include generation of audible signals such as beeps, bells, sound effects, pre-recorded voiceovers (e.g., "Cadence detected: 180 steps per minute"), etc. Other example of cadence acquired outputs include visual indicators that the cadence was detected or of the detected cadence on the user interface 164.

Additionally, in some embodiments one or multiple media content items (e.g., a playlist) are selected for playback by the media-playback device 102 based on the acquired cadence. In some embodiments, the media content items include music with a tempo that corresponds to the acquired cadence. And the media content items that are played back can be stored locally in a file or streamed from an external source such as the media-delivery system 104. For example, in some embodiments, the media-playback device 102 requests media content items that correspond to the acquired cadence.

Some embodiments do not include a separate cadence acquired output. Instead, the media output that is played back serves as an indication to the user that the cadence has been acquired.

At operation 290, the cadence is monitored. In some embodiments, the cadence is monitored by continuing to detect the cadence associated with a repetitive movement of the media-playback device 102. In other embodiments, the cadence is monitored by continuing to acquire a cadence from a separate device, a user input, or otherwise.

At operation 292, it is determined whether the cadence has changed. In some embodiments, the cadence is determined to have changed when the acquired cadence is different than the current cadence (i.e., the cadence used for playback of media content items) by more than a predetermined threshold. Additionally, in some embodiments, the cadence is determined to change when the acquired cadence is different than the current cadence for at least a predetermined duration (e.g., measured in terms of time, number of steps or other movements, etc.). In some embodiments, the predetermined threshold and predetermined duration are selected to distinguish intentional changes in cadence from short-term, environment-based adjustments. Examples of environment-based adjustments include slowing down to cross a street, changing cadence to traverse a staircase, changing cadence to turn, etc. In some embodiments, the intentionality of a change in cadence is determined based on a combination of the magnitude of difference and the duration of the change (e.g., a larger magnitude of difference requires a shorter duration to indicate an intentional change in cadence than a smaller magnitude of difference would, or vice versa, etc.). Additionally, some embodiments of the media-playback device 102 include an altimeter and changes in cadence that occur while the altitude measurement is changing rapidly are ignored (e.g., to ignore changes in cadence that occur while traversing a staircase, etc.).

If it is determined that a change in cadence has occurred the method continues to operation 294 in which a cadence changed output is generated and media content is played back based on the changed cadence. Various embodiments generate one or more change in cadence outputs. Examples of change in cadence outputs include generation of audible signals such as beeps, bells, sound effects, pre-recorded voiceovers (e.g., "New cadence detected: 170 steps per minute"), etc. Other examples of change of cadence outputs include visual indicators that a change in cadence was detected or of the changed cadence on the user interface 164.

Additionally, in some embodiments one or multiple media content items (e.g., a playlist) are selected for playback by the media-playback device 102 based on the changed cadence. As discussed above with respect to operation 288, in some embodiments, the media content items include music with a tempo that corresponds to the changed cadence. And the media content item that is played back can be stored locally in a file or streamed from an external source such as the media-delivery system 104. For example, in some embodiments, the media-playback device 102 requests media content items that correspond to the changed cadence.

In some embodiments, the media content items selected for playback based on the changed cadence are immediately played back after the change in cadence is detected (with or without beat alignment and crossfading). In other embodiments, the media-playback device completes playback of the currently playing media content item before beginning to playback the newly selected media content items. Further, in some embodiments, the media-playback device 102 continues to playback the currently-playing media content item from a buffer until a second buffer can be sufficiently populated with stream data corresponding to the newly selected media content items.

Some embodiments do not include a separate change of cadence output. Instead, the change to the media content that is being played back operates as an indication to the user that a change in cadence has been detected.

After operation 294, the method 280 returns to operation 290 where the cadence is monitored. Similarly, if it is determined that a change in cadence has not occurred at operation 292, the method returns to operation 290, where the cadence continues to be monitored.

Figure 6:
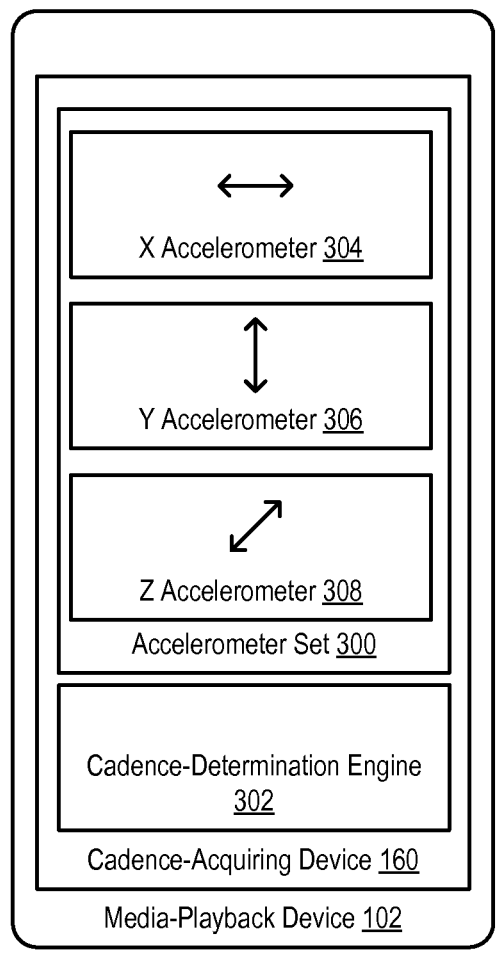
FIG. 6 illustrates an example cadence-acquiring device of FIG. 2.

FIG. 6 illustrates an example cadence-acquiring device 160. In the embodiment illustrated in FIG. 6, the cadence-acquiring device 160 operates to determine a cadence associated with a user based on movement of the media-playback device 102. In this example, the cadence-acquiring device 160 includes accelerometer set 300 and cadence-determination engine 302. Although the examples described herein use accelerometers, in other embodiments other types of movement-determining devices are used. A movement-determining device is a device that operates to capture measurements related to movement of the media-playback device. An accelerometer is an example of a movement-determining device.

The accelerometer set 300 includes at least one accelerometer. An accelerometer is a device that is used to measure acceleration, including gravitational acceleration. In some embodiments, an accelerometer measures acceleration in a single direction. In other embodiments, an accelerometer measures acceleration in more than one direction, such as in three directions. In some embodiments, the orientation of an accelerometer (and therefore the orientation of the media-playback device 102) is inferred by comparing the measured direction and magnitude of acceleration to an expected direction and magnitude of gravitational acceleration. Additionally, in some embodiments, the motion of the accelerometers is inferred from one or more measured acceleration values.

In the example shown, the accelerometer set 300 includes three accelerometers: an X accelerometer 304, a Y accelerometer 306, and a Z accelerometer 308. In this example, the X accelerometer 304 operates to measure acceleration in a horizontal direction relative to the media-playback device 102. Similarly, in this example, the Y accelerometer 306 operates to measure acceleration in a vertical direction relative to the media-playback device 102. Similarly, in this example, the Z accelerometer 308 operates to measure acceleration in a front-to-back direction relative to the media-playback device 102. In other embodiments, the accelerometer set 300 includes three accelerometers that each operate to measure acceleration in three orthogonal directions (i.e., each of the three directions is pairwise perpendicular to the other two directions). In this manner, the accelerometer set 300 operates to determine acceleration in three-dimensional space.

The cadence-determination engine 302 operates to determine a cadence based at least in part on the measurements from the accelerometer set 300. An example method of determining cadence is illustrated and described with respect to at least FIG. 7.

However, as noted above, some embodiments of the cadence-acquiring device 160 do not include the accelerometer set 300 or the cadence-determination engine 302. In these embodiments, the cadence-acquiring device 160 may operate to receive a cadence value over a network from an external device or to receive a user input representing a cadence value.

Figure 7:
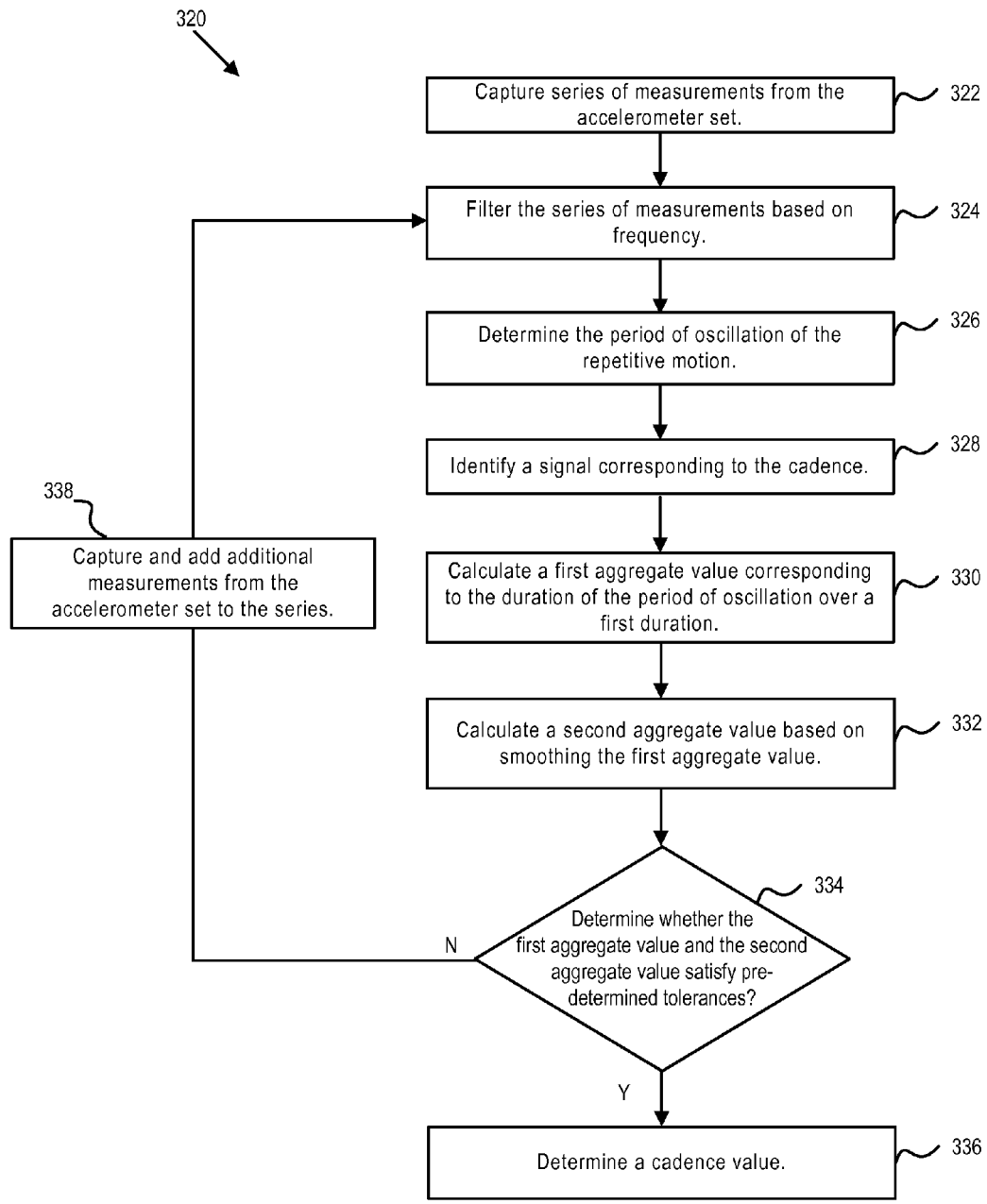
FIG. 7 illustrates an example method of determining cadence performed by some embodiments of the cadence-determination engine of FIG. 2

FIG. 7 illustrates an example method 320 of determining cadence performed by some embodiments of the cadence-determination engine 302 using the accelerometer set 300.

At operation 322, a series of measurements is captured from one or more accelerometers of the accelerometer set 300. For purposes of this example, the method 320 will be described when measurements are captured from a set of three orthogonally-oriented accelerometers. However, other embodiments capture measurements from different numbers and different configurations of accelerometers.

In at least some embodiments, the measurements are captured at a sample rate of 50 Hz. In other embodiments, the measurements are captured at a different sample rate such as a sample rate in the range of 20-200 Hz. Generally, with higher sample rates there will be less error in calculating the cadence. Other embodiments may use different sample rates, including variable sample rates, as well. In at least some embodiments, the captured samples from each accelerometer are stored as a separate series of data points.

In some embodiments, the captured measurements are amplified. For example, the acceleration measurements may be quite small when a user places the media-playback device 102 on a treadmill rather than holding it. By amplifying the measurements, the media-playback device 102 operates to sense a cadence from smaller vibrations transmitted through the treadmill. In some embodiments, the captured measurements are amplified if none of the signals from any of the accelerometers exceed a pre-defined threshold for a specific period of time. Furthermore, some embodiments operate to amplify the captured measurements if the location-determining device 150 indicates that the user is indoors or stationary.

At operation 324, the series of measurements are filtered based on frequency to generate filtered signals. For example, in some embodiments, each of the series are filtered with a band-pass filter such as a band-pass filter comprising third-order Butterworth filters. Beneficially, Butterworth filters provide a generally flat frequency response and thus allows for reliable energy estimation of the filtered signal. Furthermore, a third-order Butterworth filter provides a steep enough response to discard/attenuate signals outside of the desired region. Other embodiments, however, use other types of band-pass filters. For example, some embodiments use a fifth-order Butterworth filter. In some embodiments, the band-pass filter is tuned to pass the portion of the signal in the series that is likely to correspond to running (e.g., having a frequency of 140-200 steps per minute). For example, the band-pass filter may discard frequencies below 140 steps per minutes (e.g., walking, holding the media-playback device 102, etc.) and above 200 steps per minute (e.g., vibrations).

Figure 8:
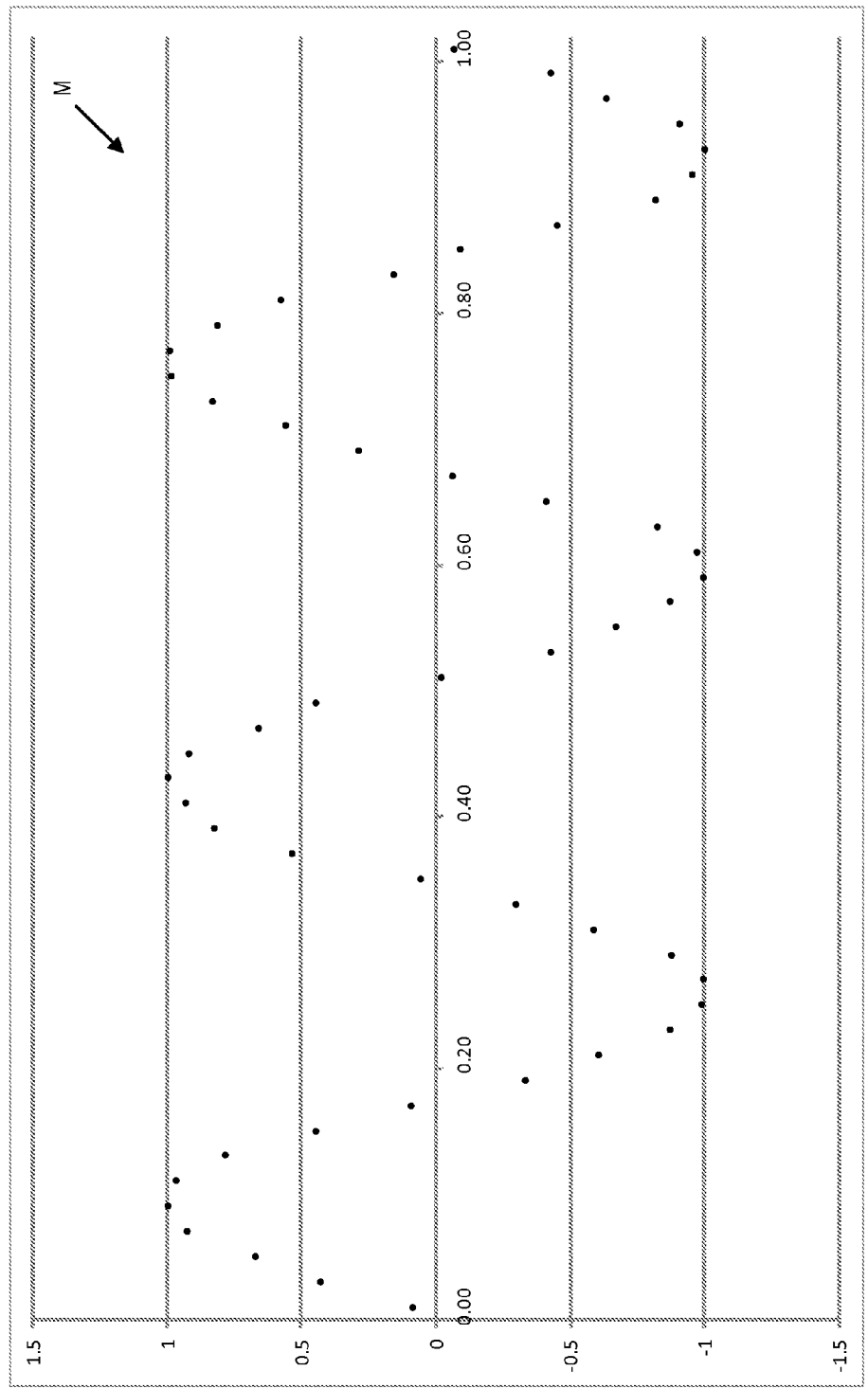
FIG. 8 shows an example series of filtered sample measurements from the accelerometer of FIG. 6.
Figure 9:
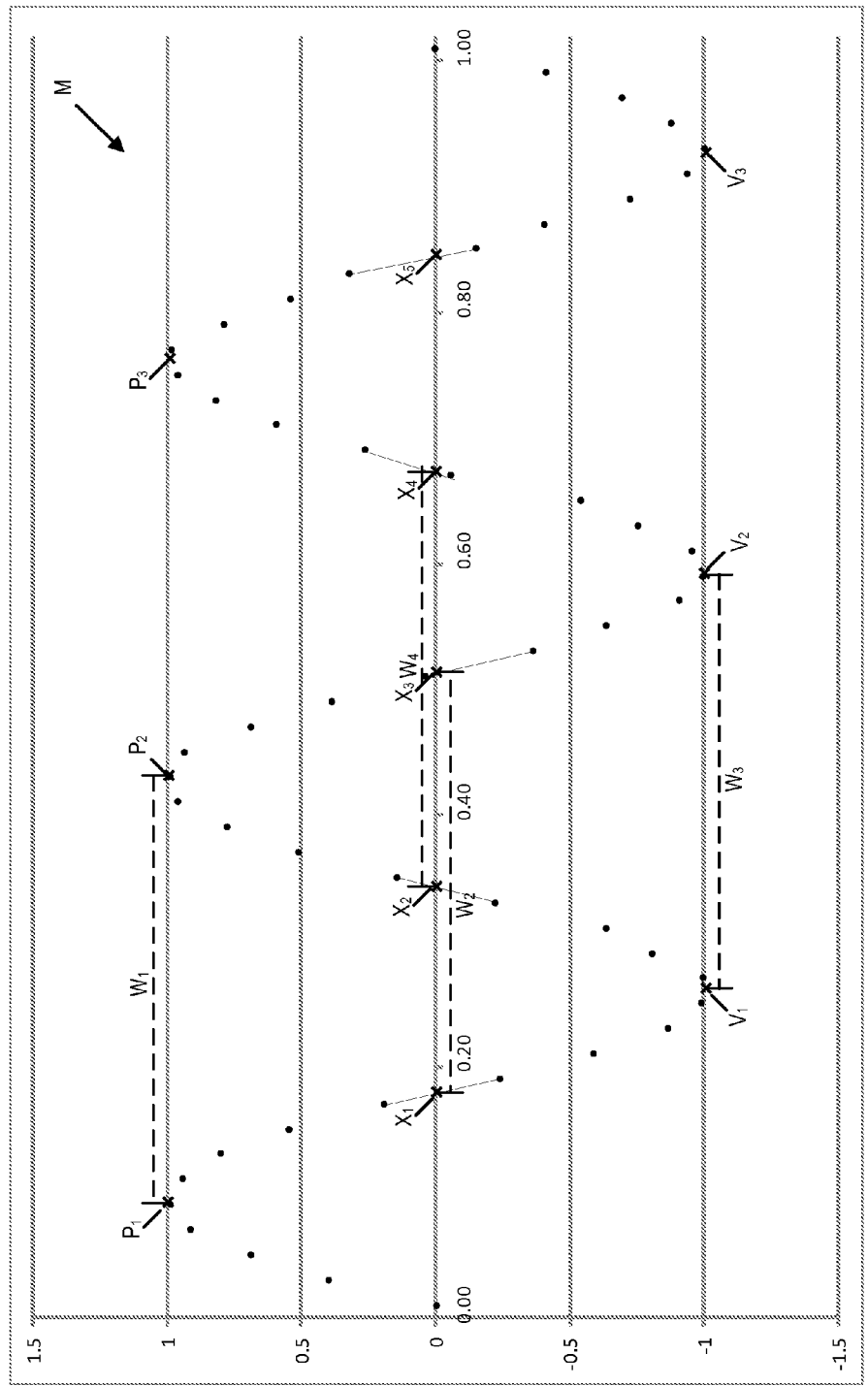
FIG. 9 shows the example series of filtered sample measurements of FIG. 8 with additional annotations to identify portions of the signal that are used in analyzing the periodicity of the repetitive motion.

At operation 326, the filtered signals are analyzed to determine the period of oscillation of the repetitive motion. FIGS. 8 and 9, which are discussed below, illustrate samples from an example signal and corresponding periods of repetitive motion. FIG. 8 shows an example series of filtered sample measurements M from an accelerometer captured over one second. FIG. 9 shows the same series of filtered sample measurements M with additional annotations to identify portions of the signal that are used in analyzing the periodicity of the repetitive motion. In some embodiments, each of the signals captured (i.e., the samples from each of the accelerometers in the accelerometer set) are analyzed to determine the period of oscillation of the repetitive motion. In other embodiments, a single signal is determined to be indicative of the cadence (see operation 328), and only this single signal is analyzed to determine the period of oscillation for the repetitive motion of that signal (operation 326). Therefore in some embodiments the operation 328 may be performed before operation 326.

In some embodiments, the period of repetitive motion is estimated by analyzing the filtered signals to identify (or approximate) zero crossings of the signal. In some embodiments, the zero crossings of the signal are approximated by linearly interpolating between two adjacent samples that are on opposite sides of zero. In FIG. 9, five example approximated zero crossings are shown as zero crossings $X_1$-$X_5$. Additionally, in some embodiments, minima and maxima are also identified (or approximated) for each oscillation. In some embodiments, a parabolic approximation is used to approximate the minima and maxima of each oscillation. Other embodiments may use the value of a local minimum or maximum sample point. In FIG. 9, the maxima (peaks) are shown as maxima $P_1$-$P_3$ and the minima (valleys) are shown as minima $V_1$-$V_3$.

In some embodiments, the period of the repetitive motion is then estimated by measuring the distance between equivalent points in adjacent oscillations. For example, in some embodiments, the period is estimated by calculating the distance between adjacent wave maxima (e.g., in FIG. 9, width $W_1$ between the maxima $P_1$ and the maxima $P_2$). Similarly, the period can be estimated by calculating the distance between adjacent falling zero crossings (e.g., in FIG. 9, width $W_2$ between the zero crossing $X_1$ and the zero crossing $X_3$) and between adjacent rising zero crossings (e.g., in FIG. 9, width $W_4$ between the zero crossing $X_2$ and the zero crossing $X_4$). Additionally, the period can be estimated by calculating the distance between adjacent wave minima (e.g., in FIG. 9, the width $W_3$ between minima $V_1$ and minima $V_2$). In this manner, the width of a period of a single oscillation is measured four times, with the measurements being offset from each other by quarter oscillations.

In some embodiments, during operation 326, a single measurement of the period of oscillation for each of the signals (e.g., from each of the accelerometers) is calculated and stored. In some embodiments, this single measurement is added to a First-In-First-Out buffer that operates as a circular buffer for storing a predetermined number of measurements. As operation 326 is repeated, the FIFO buffer fills up with measurements. When the FIFO buffer is full, new measurements replace the oldest measurement in the FIFO buffer. In this manner, the FIFO buffer operates to store a predetermined number of the most recent measurements of the period of oscillation. Some embodiments include multiple FIFO buffers and each of the multiple FIFO buffers is configured to store measurements determined from a different accelerometer. However, as noted above, in some embodiments, measurements are only determined for a single signal. In these embodiments, a single FIFO buffer may be used to store the measurements from the signal that has been identified as corresponding to cadence.

In at least some embodiments, one or more FIFO buffers are configured to each store twenty-four measurements. Because these width measurements are calculated at every quarter step, twenty-four measurements are captured across approximately six steps (which takes two seconds at an example running cadence of 180 steps per minute). Because the FIFO queues are updated based upon oscillations occurring in the filtered signals in some embodiments, if the user stops running and stands still, the FIFO buffer will not be updated (and beneficially the calculated cadence will not be impacted by the stop).

In some embodiments, the measurements stored in the FIFO buffer or buffers are converted to a log base 2 scale. Beneficially, when the measurements are converted to a log base 2 scale, the measurements remain linear across a range of cadence values.

At operation 328, a signal corresponding to the cadence is identified. In some embodiments, the signal corresponding to the cadence is a signal from at least one of the accelerometers that is most likely correlated with cadence. Because the orientation of the media-playback device 102 relative to the user U may not be fixed (e.g., when the media-playback device 102 is a smartphone or other mobile device), some embodiments analyze the signals captured by the various accelerometers to determine which of the accelerometers is oriented to detect movement in the direction of the repetitive motion at a given time. In other embodiments, a signal corresponding to the direction of relevant movement may be identified by combining the signals captured by multiple of the accelerometers.

In some embodiments, the signal corresponding to the direction of relevant movement is identified based on identifying the filtered accelerometer signal having the highest energy. In some embodiments, the energy of each of the filtered signals is calculated by rectifying the filtered signal and convoluting the rectified signal with a Hanning window of fifty samples (i.e., one second worth of samples at fifty Hz). Other embodiments use a number of samples selected from the range 10-100 samples. In some embodiments, other techniques are used to calculate the energy of the filtered signals.

In some embodiments, the highest energy signal is determined after each sample is recorded. In other embodiments, the highest energy signal is determined at a different interval. Further, in at least some embodiments, the identity of the highest energy signal is tracked (e.g., after every sample or every tenth sample) so that the identity of the highest-energy signal (and therefore the direction of the repetitive movement) can be updated if necessary. Beneficially, by tracking the highest energy signal, changes in the orientation of the media-playback device 102 will not interfere with identifying the accelerometer associated with the direction of the repetitive movement. In some embodiments, a signal corresponding to the cadence is identified by combining portions of multiple filtered series from different accelerometers to include the data from the series having the highest energy over each time interval.

In other embodiments, other methods of determining the direction of relative movement are used. For example, if the orientation of the media-playback device 102 relative to the user U is known or can be inferred, the signal from a particular accelerometer may be identified as corresponding to the expected direction of relevant motion based on the direction of movement to which the particular accelerometer is sensitive (which can be inferred from the orientation of the media-playback device 102 relative to the user). As an example, if the media-playback device 102 is oriented in an upright position, it can be inferred that that the Y accelerometer 306 will be sensitive to vertical movement such as would be expected from running. In this example, the signal from the Y accelerometer 306 is used in some embodiments.

At operation 330, a first aggregate value corresponding to the period of the oscillation over a first duration is calculated. In some embodiments, the first duration is based on a predetermined number of oscillations, such as six oscillations. Other embodiments have a first duration based on a different predetermined number of oscillations such as 4-10 oscillations. In other embodiments, the first duration corresponds to a predetermined time period such as 2-10 seconds.

In some embodiments, the first aggregate value is calculated by averaging multiple estimated widths of the period of oscillation. For example, in some embodiments, twenty-four estimated width values captured every quarter oscillation (e.g., the values stored in the FIFO buffer described at least with respect to operation 326) are averaged to generate the first aggregate value. In some embodiment, the FIFO buffer is updated with a new value every quarter oscillation and the first aggregate value is also recalculated every quarter oscillation using the updated values in the FIFO buffer. In some embodiments, the FIFO buffer is pre-populated with measurements that correspond to a typical cadence at the start of method 320 so that a reasonable first aggregate value may be calculated before enough measurements have been captured to fully fill the FIFO buffer. In some embodiments, the typical cadence value used to generate values to prepopulate the FIFO buffer is 165 steps per minute. In other embodiments, the typical cadence is calculated based on historic cadence information associated with the user (such as cadence data captured from previous similar activities performed by the user). Because the first aggregate value is based on averaging multiple measurements, in at least some embodiments, the aggregate value is not significantly affected by intermittent sampling errors or minor, short variations in cadence.

Furthermore, in some embodiments, a series of first aggregate values is generated as additional measurements are captured. In some embodiments, each of the values in the series of first aggregate values correspond to the period of oscillation at different time intervals over which the series of measurements span. In some embodiments, a first aggregate value is generated and included in the series after every quarter oscillation. In other embodiments, the first aggregate value is generated at a different frequency such as once every oscillation, once every second oscillation, etc.

At operation 332, a second aggregate value is calculated based on smoothing the first aggregate value. In some embodiments, the second aggregate value is updated (or re-calculated) when the first aggregate value is updated. In some embodiments, the second aggregate value is calculated using equation 1 shown below:

$$y(i)=y(i-1)+\alpha \times (x(i)-y(i-1)) \qquad (1)$$

where y(i) represents the currently calculated value for the second aggregate value;

y(i−1) represents the previously calculated value for the second aggregate value;

x(i) represents the most recently calculated value for the first aggregate value (e.g., as calculated by operation 330); and α is a smoothing coefficient.

In some embodiments, the smoothing coefficient α is 0.25. In other embodiments, the smoothing coefficient α is a value selected from the range 0.2-0.6. In yet other embodiments, the smoothing coefficient α is a value selected from the range 0.01-0.99. The smoothing coefficient α causes the second aggregate value to change more slowly than the first aggregate value changes in response to changes in cadence. In some embodiments, the second aggregate value is initially set to a value that corresponds to a cadence that is slightly lower than would be expected for the activity. For example, in some embodiments that relate to running, the second aggregate value is initially set to a value corresponding to a cadence of 140 steps per minute. In other embodiments, the second aggregate value is initially set to a value that is twenty-five steps per minute less than the user's historic average cadence for the activity.

In at least some embodiments, other equations or techniques are used to smooth the second aggregate value. Embodiments are possible using any technique for smoothing the second aggregate value in which a previously computed value for the second aggregate value is used in computing an updated value for the second aggregate value.

Like the first aggregate value, in some embodiments, a series of second aggregate values is generated as additional measurements are captured. In some embodiments, each of the values in the series of second aggregate values correspond to a smoothed first aggregate value for different time intervals over which the series of measurements span. Also like the series of first aggregate values, in various embodiments, the values in the series of second aggregate values are generated at various frequencies such as after every quarter oscillation, after every oscillation, after every other oscillation, etc.

At operation 334, it is determined whether the first aggregate value and the second aggregate value satisfy predetermined tolerances. As noted above, the second aggregate value changes more slowly than the first aggregate value changes in response to a change in cadence (e.g., when the user first starts running, when the runner changes cadence, etc.). Accordingly, in some embodiments, the difference between the first aggregate value and the second aggregate value indicates whether the user's cadence has been stable or changing recently.

In some embodiments, the predetermined tolerances include both a difference tolerance and a duration requirement. An example of a difference tolerance is predetermined number of steps per minute difference between the first aggregate value and the second aggregate value (e.g., within two steps per minute, or within a certain duration of time measured on a linear or log base 2 scale, etc.). An example of a duration requirement is a requirement that the first aggregate value and the second aggregate value satisfy the difference tolerance for a predetermined duration (e.g., the first aggregate value is within two steps per minute of the second aggregate value for at least two steps). In some embodiments, the predetermined duration is measured in steps, time, or otherwise.

If it is determined that the first aggregate value and the second aggregate value satisfy predetermined thresholds, the method 320 continues to operation 336 where the cadence is determined. If not, the method 320 continues to operation 338 where additional measurements are captured from the accelerometers in the accelerometer set and the process repeats starting at operation 324.

At operation 336, a cadence value is determined. In some embodiments, the cadence value is determined based on the second aggregate value. To determine a cadence value from the second aggregate value, the second aggregate value may need to be converted from a duration in log base 2 scale to a frequency value. Once the cadence value has been determined, it can be used for many purposes, including selecting appropriate media content items.

In some embodiments, the method 320 is used to both determine an initial cadence and to detect changes in cadence throughout an activity. As noted above, to detect an initial cadence, the FIFO buffer or buffers and second aggregate values may be set to certain initial values that are selected to minimize the number of steps (or time) required to accurately detect a stable cadence. For example, by populating the FIFO buffer or buffers with values that correspond to an expected (or typical) cadence value, the first aggregate value calculated by operation 330 will immediately be close to a value that corresponds to the user's instantaneous cadence. As another example, initially setting the second aggregate value to a value that corresponds to a cadence that is slightly outside of the expected range may prevent falsely determining a stable cadence before the user has actually reached a stable cadence. Instead, a stable cadence will be determined after the user has performed with a stable cadence for a sufficient time to cause the initially low second aggregate value to converge towards the first aggregate value. In some embodiments, a stable cadence is detected within ten to fifteen steps.

In some embodiments, a third aggregate value is calculated in a manner similar to the calculation of the second aggregate value (as described above with respect to operation 332). The third aggregate value may be used to determine when the user has changed cadence after an initial cadence has been determined. In some embodiments, the third aggregate value represents a smoothing of the second aggregate value. In this manner, the third aggregate value trails the second aggregate value and takes a longer time to react to changes in cadence. Additionally, in some embodiments, when the third aggregate value and the second aggregate value are within a predetermined difference threshold of each other for a predetermined duration threshold it is determined that the detected cadence value has stabilized. If the detected cadence value has stabilized at a value that is different from the previously determined cadence by a sufficient threshold a new cadence value is determined (and may be used in media content selection or otherwise). Examples of sufficient thresholds include two steps per minute, five steps per minute, or ten steps per minute. In some embodiments, the sufficient threshold is a value selected from the range 1-15 steps per minute.

In at least some embodiments, the third aggregate value is calculated using an equation that is similar to equation 1 (described above with respect to operation 332) such as equation 2 shown below:

$$z(i)=z(i-1)+\beta \times (y(i)-z(i-1)) \qquad (2)$$

where z(i) represents the currently calculated value for the third aggregate value;

z(i−1) represents the previously calculated value for the third aggregate value;

y(i) represents the most recently calculated value for the second aggregate value (e.g., as calculated by operation 332); and β is a second smoothing coefficient.

The second smoothing coefficient β is similar to the smoothing coefficient α and can be set to the same values and ranges described above. In some embodiments, the second smoothing coefficient β is set to the same value as the smoothing coefficient α, while in other embodiments the second smoothing coefficient β is set to a different value than the smoothing coefficient α. The second smoothing coefficient β causes the third aggregate value to change even more slowly than the second aggregate value changes in response to changes in cadence. As mentioned above with respect to the second aggregate value, the third aggregate value is also calculated using other smoothing equations in some embodiments.

Like the first aggregate value and the second aggregate value, in some embodiments, a series of third aggregate values is generated. The values in the series of third aggregate values correspond to smoothed second aggregate values over various intervals over which the series of measurements span. The values in the series of third aggregate values may be generated at the same frequency as the values in the series of second aggregate values or at a different frequency.

Figure 10:
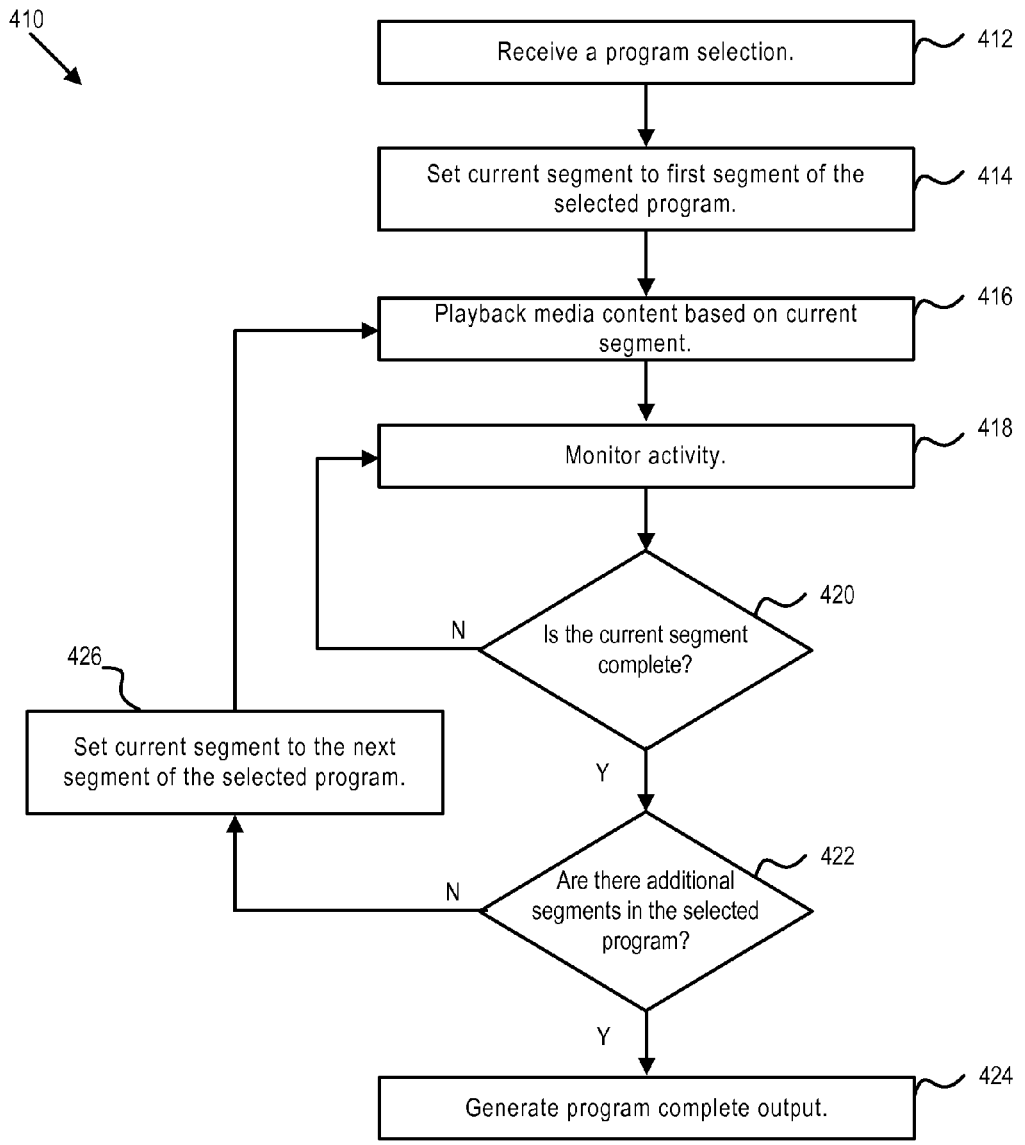
FIG. 10 illustrates an example method of selecting media content according to an enhancement program performed by some embodiments of the enhancement program engine of FIG. 3.

FIG. 10 illustrates an example method 410 of selecting media content according to an enhancement program performed by some embodiments of the enhancement program engine 244.

At operation 412, a program selection is received. In some embodiments, the program selection is received via a touch input on a portion of a screen displayed by the user interface 164 such as the example screen illustrated and described with respect to at least FIG. 18. Additionally, in some embodiments, the program selection is received by other methods such as voice input or a movement (or pattern of movement) of the user's body or the media-playback device 102.

At operation 414, a current segment is set to a first segment of a selected program. In some embodiments, the programs can have any number of segments, including having only one segment. A program with only a single segment operates to playback media content having a tempo that corresponds to a constant cadence. Alternatively, some programs have multiple segments. Examples of segments include, warm-up, workout, interval (which may be implemented as multiple segments), and cool down segments. In some embodiments, segments include a fixed cadence (or corresponding tempo) and a duration. Additionally, in some embodiments, a segment includes a formula for calculating a cadence (or corresponding tempo) during the segment. For example, a formula might operate to cause the cadence to slowly increase throughout the duration of the segment. Furthermore, some embodiments include various rules that relate to completing a segment. Example rules are based on reaching a particular location, reaching a particular physiological measurement, reaching a particular cadence or pace, ascending/descending a particular distance, etc. Another example rule is based on whether the user is able to match the beat of the music (e.g., match his or her foot strikes to the beat of the music). Examples of how to determine whether foot strikes are aligned to the beat are provided in U.S. Patent Application Ser. No. 62/163,856, titled CADENCE AND MEDIA CONTENT PHASE ALIGNMENT, filed on May 19, 2015, the entirety of which is hereby incorporated by reference.

At operation 416, media content is played back based on the current segment. For example, the current segment may define a particular target cadence and during the segment media content corresponding to that cadence will be played back to encourage the user to achieve the target cadence.

At operation 418, the activity is monitored. At operation 420, it is determined whether the current segment is complete. In some embodiments, the determination whether the current segment is complete is based at least in part on one or more of a specified duration of the segment and rules for the segment. If the current segment is not complete, the method 410 returns to operation 418 where the activity continues to be monitored.

If instead the current segment is complete, the method 410 continues to operation 422 where it is determined whether there are additional segments in the selected program. In some embodiments, the media-playback device progresses through the segments sequentially and when a last segment in the sequence is completed, it is determined that there are no additional segments in the program. Additionally, in some embodiments, there are various rules to determine whether segments should be repeated and so those rules are evaluated to determine whether there are any additional segments in the selected program.

If there are no additional segments in the selected program, the method 410 proceeds to operation 424 in which a program complete output is generated. Example program complete outputs include sound effects and graphical indications that the program is complete.

If there are additional segments in the selected program, the method 410 continues to operation 426, where the current segment is set to the next segment in the program. Then, the method 410 returns to operation 416 where media is played back according to the segment as described above.

Figure 11:
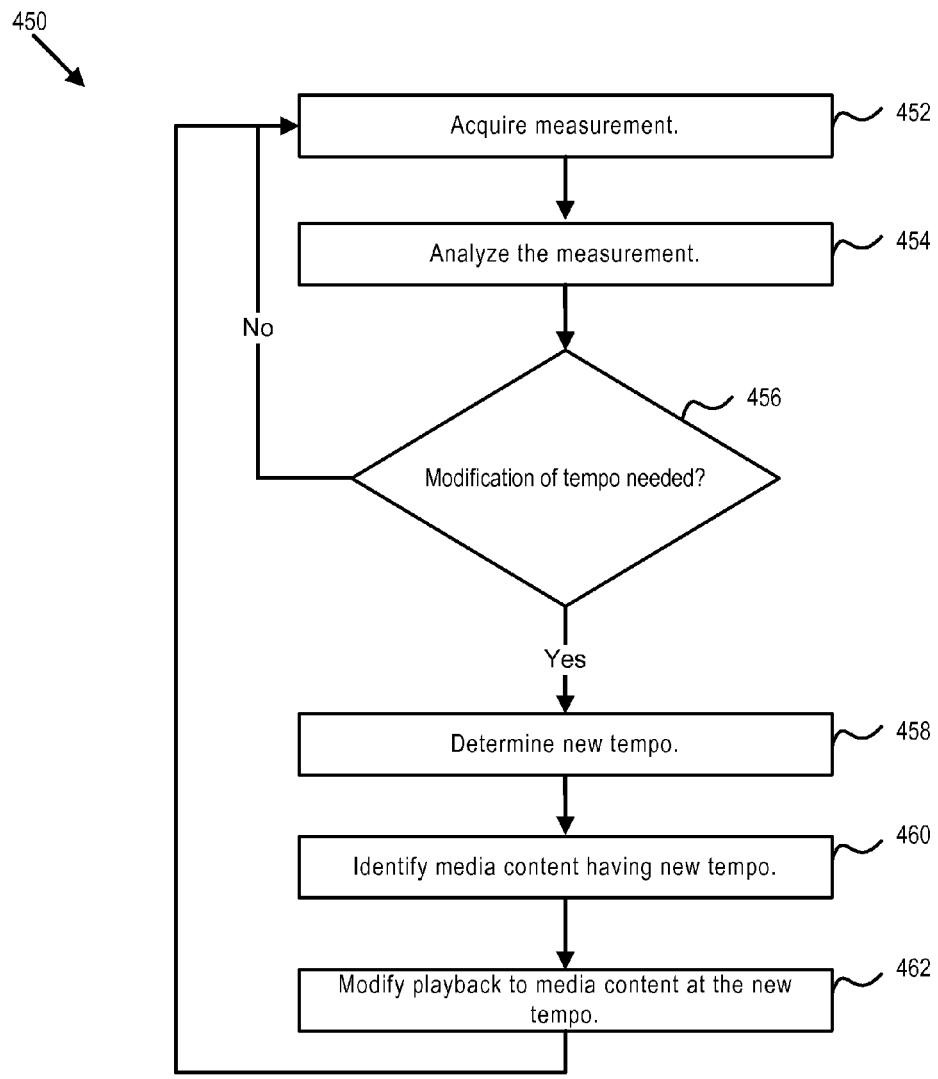
FIG. 11 illustrates an example method of modifying tempo based upon one or more physiological measurements obtained by some embodiments of the media-playback device of FIG. 1.

FIG. 11 illustrates an example method 450 of using an external measurement to control the tempo of the media content played by the media-playback device 102.

At step 452, a measurement is obtained by the media-playback device 102.

In some examples, this measurement includes one or more physiological measurements, such as the user U's heart rate (see FIGS. 12-14), respiration, temperature, sweat, stress, VO2, etc. In some examples, the physiological measurements can be obtained directly by the media-playback device 102. For example, if the media-playback device 102 is a watch, the watch can be configured with a heart rate sensor to approximate the heart rate of the user U. In other examples, one or more external sensors, such as a heart rate band worn around the torso, can be used to obtain the measurements. These measurements can be communicated to the media-playback device 102 using one or more known protocols, such as Bluetooth or ANT+ protocols.

Figure 14:
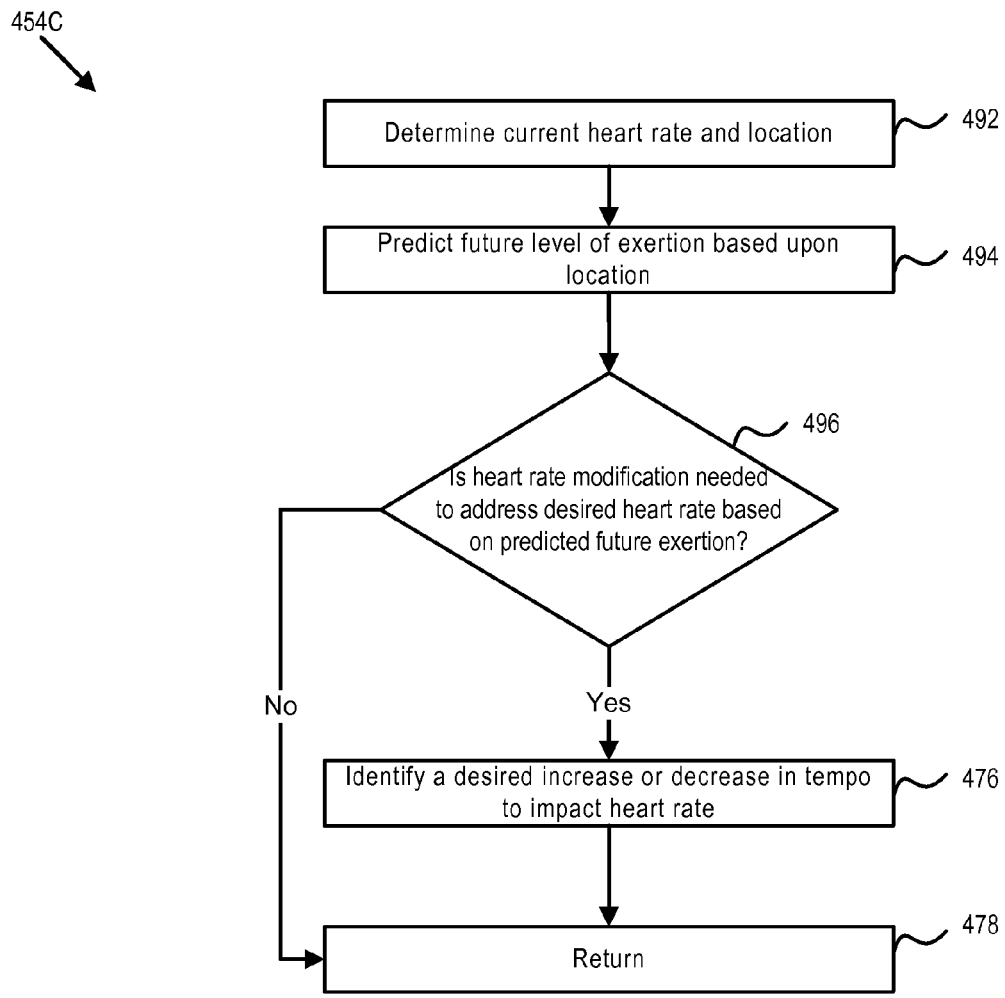
FIG. 14 illustrates another example method of modifying tempo based upon heart rate and current location obtained by some embodiments of the media-playback device of FIG. 1.

In other examples, the measurement can be a non-physiological measurement, such as the location of the user U (see FIG. 14). In these examples, the media-playback device 102 can directly provide the measurement (e.g., using the location-determining device 150 that receives GPS signals 170), or an external sensor can again be used.

At step 454, the measurement is analyzed. For example, as referred to in FIGS. 13-14, the physiological control engine 246 can be programmed to determine if the user U's heart rate is at a desired rate or too high/low. The user U's heart rate can be analyzed to determine if it falls within a desired range of rates.

At step 456, the media-playback device 102 analyzes the measurement to determine if a change in the tempo of the media content that is currently being played is needed to impact the measurement. For example, the tempo of the media content can be increased or decreased as noted below.

If the tempo does not need to be modified, control is passed back to step 452 and another measurement is acquired (e.g., in near real time or at periodic or manual intervals).

If the tempo does need to be modified, control is passed to operation 458, and the media-playback device 102 determines a new tempo for the media content being played. For example, if the physiological measurement is high or low, the media-playback device 102 can be programmed to increase or decrease the tempo of the media content in an attempt to impact the physiological measurement.

At step 460, media content having the new tempo is identified. In some examples, media content is categorized by tempo and can be accessed as desired to provide a certain tempo to encourage the user to maintain and/or increase/decrease the level of exertion through a maintenance or modification of the user's cadence. Examples of categorizing such media content is provided in U.S. Patent Application Ser. No. 62/163,887, titled MULTI-TRACK PLAYBACK OF MEDIA CONTENT DURING REPETITIVE MOTION ACTIVITIES, filed on May 19, 2015, the entirety of which is hereby incorporated by reference.

Finally, at step 460, the media-playback device 102 modifies playback to include the media content at the new tempo. In one example, the tempo of the media content that is currently being played by the media-playback device 102 can be modified (e.g., increased or decreased) to the new tempo. In another example, different media content having the new tempo can be played.

In some examples, the transition beat or beats between the current media content and the new media content are matched so that the user can maintain a steady cadence and transition increasing or decreasing the user U's cadence. An examples method of matching beats is illustrated and described with respect to at least FIG. 15.

Figure 12:
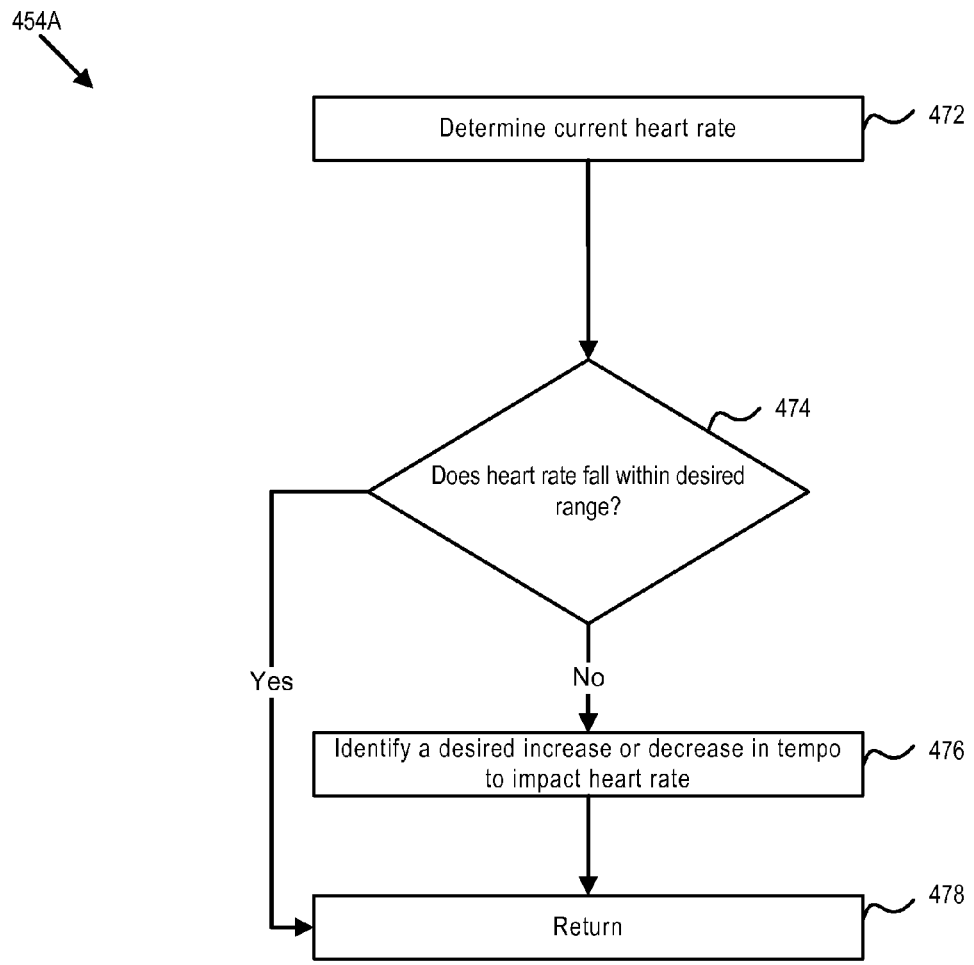
FIG. 12 illustrates an example method of modifying tempo based upon heart rate obtained by some embodiments of the media-playback device of FIG. 1.

Referring now to FIG. 12, an example method 454A is illustrated to show additional details about the step 454 of analyzing the measurement. In this example, the measurement is the heart rate of the user U, as measured by one or more sensors associated with the media-playback device 102, either directly or by, for example, a separate heart rate monitor device.

At step 472, the user U's current heart rate is determined from the measurements obtained from the sensor or sensors.

Next, at step 474, the media-playback device 102 determines if the heart rate falls within a desired range.

For example, many athletes train at a desired intensity. This intensity is commonly measured or approximated by analyzing the athlete's heart rate. The athlete may desire to keep his or her heart rate a certain level, such as below the anaerobic threshold for the athlete. In another example, the athlete may desire to keep the athlete's heart rate within a certain minimum or maximum thresholds, sometimes referred to as a particular heart rate zone.

The media-playback device 102 can be programmed to monitor these thresholds and determine if the user U's heart rate falls within the desired range. If so, control is passed to step 478, and control is returned to the method 450 described above.

If not, control is instead passed to operation 476, and the media-playback device 102 determines whether an increase or decrease in tempo may be desirable to impact the user U's heart rate.

For example, if the user U wishes to maintain his or her heart rate between 120 and 130 beats per minute, and the media-playback device 102 determines that the user U's heart rate is currently 115 beats per minute, the media-playback device 102 may determine that an increase in the tempo of the media content is desirable. This increase in the tempo of the media content is performed to assist or encourage the user U to increase the user U's intensity, such as cadence. This increased cadence can result in an increase in the user U's heart rate into the desired range.

Figure 13:
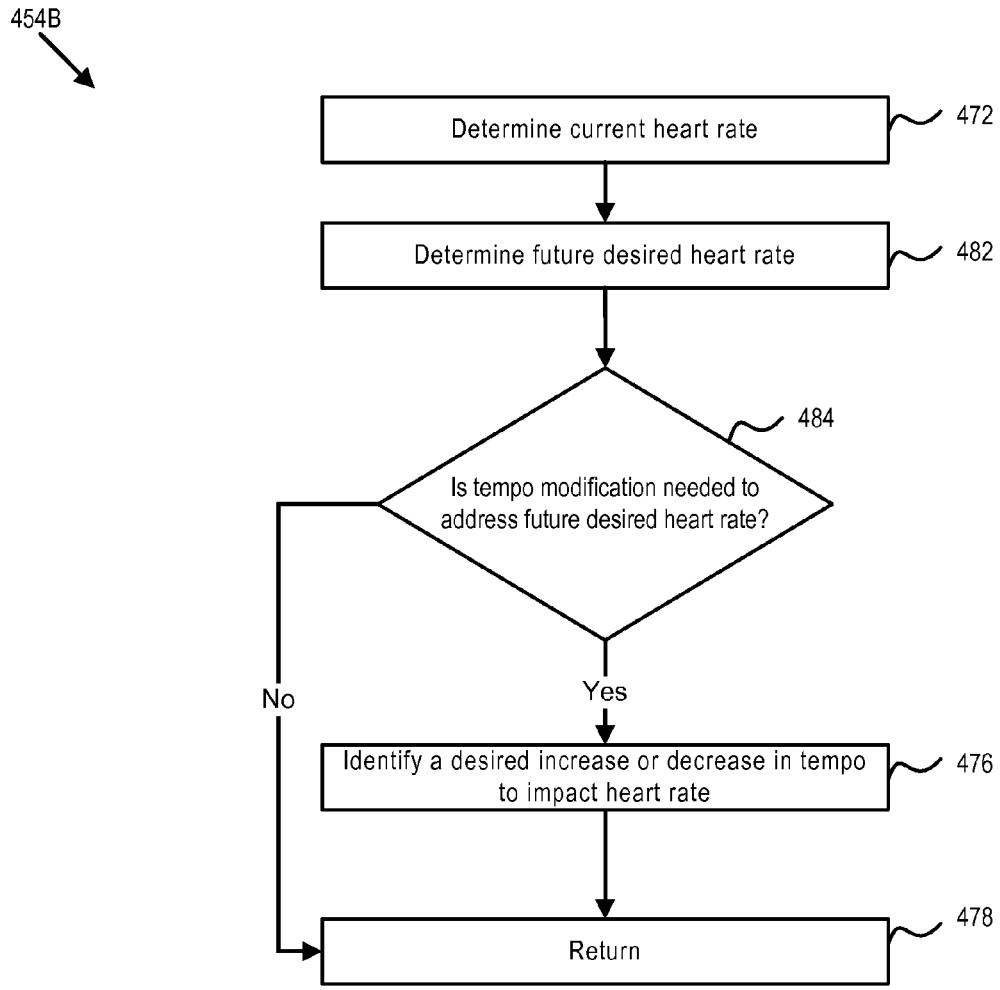
FIG. 13 illustrates another example method of modifying tempo based upon heart rate obtained by some embodiments of the media-playback device of FIG. 1.

Referring now to FIG. 13, another example of a method 454B is shown. The method 454B is similar to the method 454A described above, except at step 482 the media-playback device 102 compares the current heart rate of the user U to a future desired heart rate, such as a heart rate desired at a future point in time.

For example, the user U can define a workout plan that involves one or more changes in the user U's heart rate. For example, the user U can define a workout that requires the user U to maintain a first heart rate for a certain interval (e.g., 1 minute, 1 mile, etc.) and then to change that heart rate to a future heart rate for another interval.

The media-playback device 102 determines at step 484 when the future desired heart rate is approaching (e.g., when the user is close to a minute at the current heart rate) and starts to increase or decrease the tempo of the media content to assist the user in reaching the future heart rate at the desired time and/or distance. The workout plan for the user U can involve two or more heart rate changes, and the media-playback device 102 is programmed to assist the user U with those changes by shifting the media content to encourage the user U to increase or decrease the user U's cadence as needed to increase or decrease the user U's future heart rate.

At FIG. 14, another example of a method 454C is shown. The method 454C is similar to the method 454A described above, except at step 492 the media-playback device 102 determines both the heart rate and location of the user U. The location can be determined, for example, using the location-determining device 150.

Next, at step 494, the media-playback device 102 is programmed to estimate a future level of exertion for the user U based upon a future anticipated location of the user. For example, based upon the location, the media-playback device 102 can determine that the user U is approaching a hill. This determination can be made, for example, based upon elevation data accessed by the media-playback device 102 and the current direction of the user U and/or a preselected route provided by the user U.

When the media-playback device 102 determines that a hill is approaching based upon the location, a determination is made at step 496 as to whether or not the tempo of the media content should be modified in order to influence the performance of the user U.

For example, if the user U wishes to maintain a heart rate in a certain range, and the media-playback device 102 determines that a steep hill is approaching, the media-playback device 102 can select media content with a slower tempo to encourage the user U to slow his or her cadence as the hill approaches. This slower cadence will allow the user to maintain a lower heart rate as the user walks or runs up the hill.

In another example, if the media-playback device 102 determines that the user is approaching a downhill, the media-playback device 102 can increase the tempo of the media content that is playing to encourage an increase in cadence while maintaining the same heart rate, since the level of exertion for the user U will be less on the downhill.

Many alternatives are possible. For example, the user can program the media-playback device 102 to increase or decrease the tempo of the media content based upon location features (e.g., hills, etc.), the location itself (e.g., the user can have an increase in tempo during a certain stretch of a run to encourage increased cardiac output), and/or a combination of the current heart rate and location, as noted above.

In yet another example, multiple physiological measurements can be used to determine the current and future desired performance of the user. For example, both heart rate and respiration can be measured and the media content modified as desired to impact the heart rate and/or respiration of the user. Other configurations are possible.

Figure 15:
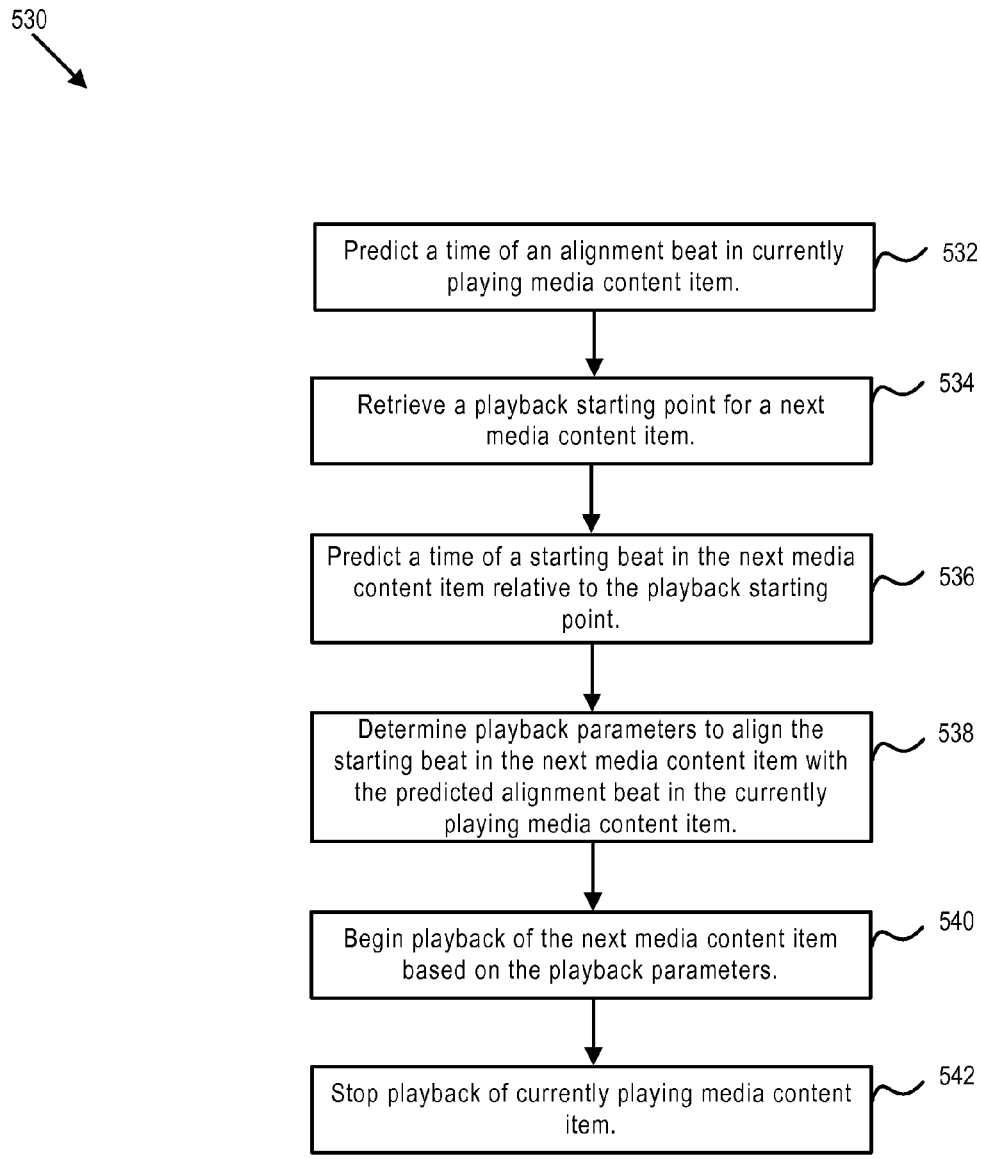
FIG. 15 illustrates an example method of aligning media content items for playback performed by some embodiments of the media content alignment engine of FIG. 3.

FIG. 15 illustrates an example method 530 of aligning media content items for playback performed by some embodiments of the media content alignment engine 248. The method 530 can be used to align the beat of two media content items to create a smooth transition between the media content items and minimize distraction or interruption of the user. In some embodiments beats are aligned. Additionally, in some embodiments, bars (otherwise known as measures) are aligned such that the downbeat (i.e., the first beat of a bar) are aligned. The method 530 is described in terms of beat alignment, but the techniques described are equally applicable to bar (or measure) alignment.

At operation 532, a time at which an alignment beat of the currently playing media content item is played is predicted. In some embodiments, the alignment beat is the next beat based on the current playback position of the media content item (e.g., to cause an immediate transition). Alternatively, the alignment beat is a beat occurring at or near a mix-out point of the currently playing media content item. Furthermore, in some embodiments, the alignment beat is calculated based on the mix-out point but with an additional time for fading out (e.g., the alignment beat may be the beat occurring approximately five seconds before a specified mix-out timestamp). Additionally, in some embodiments, the mix-out point is retrieved from either the repetitive-motion activity media metadata 232 or the media content metadata 214. Examples of calculating and using mix-out and mix-in points are provided in U.S. Patent Application Ser. No. 62/163,865, titled SYSTEM FOR MANAGING TRANSITIONS BETWEEN MEDIA CONTENT ITEMS, filed on May 19, 2015, the entirety of which is hereby incorporated by reference.

In some embodiments, the time of the alignment beat is predicted based on metadata associated with the media content item (e.g., the media content metadata 214 retrieved from the media-delivery system 104). In some embodiments, the metadata includes timestamps of each beat in the media content item. Alternatively, the metadata includes timestamps of a subset of beats in a media content item. In these embodiments, the time of occurrence of other beats is calculated based on the tempo of the media content item (or the relevant portion of the media content item). In media content items that have a stable beat such as is common with electronic music, a single timestamp is sufficient to determine the location of all other beats.

At operation 534, the playback starting point the next media content item is retrieved. In some embodiments, the playback starting point is the beginning of the media content item. Additionally, in some embodiments, the playback starting point is a mix-in point, which may be is retrieved from either the repetitive-motion activity media metadata 232 or the media content metadata 214 as described previously. Additionally, in some embodiments, the starting point is calculated based on the mix-in point but with an additional time period for fading in.

At operation 536, a time at which a starting beat of the next media content item is predicted. In some embodiments, the starting beat is the first beat to occur after the starting point. Predicting the time of the starting point is similar to predicting the time of the alignment beat described above.

At operation 538, playback parameters are determined to align the starting beat in the next media content item with the predicted alignment beat in the currently playing media content item. Examples of playback parameters include a starting time and a starting offset for the next media content item.

At operation 540, playback of the next media content item begins in accordance with the playback parameters. In some embodiments, the next media content item fades in (e.g., starting at a low volume that increases over a time period). In other embodiments, the next media content item begins playback at a full volume subject to a volume setting of the media-playback device 102.

At operation 542, the play back of the currently playing media content item is stopped. In some embodiments, the currently playing media content item is stopped immediately. In other embodiments, the currently playing media content item is stopped by fading out (e.g., decreasing in volume over a time period).

Figure 16:
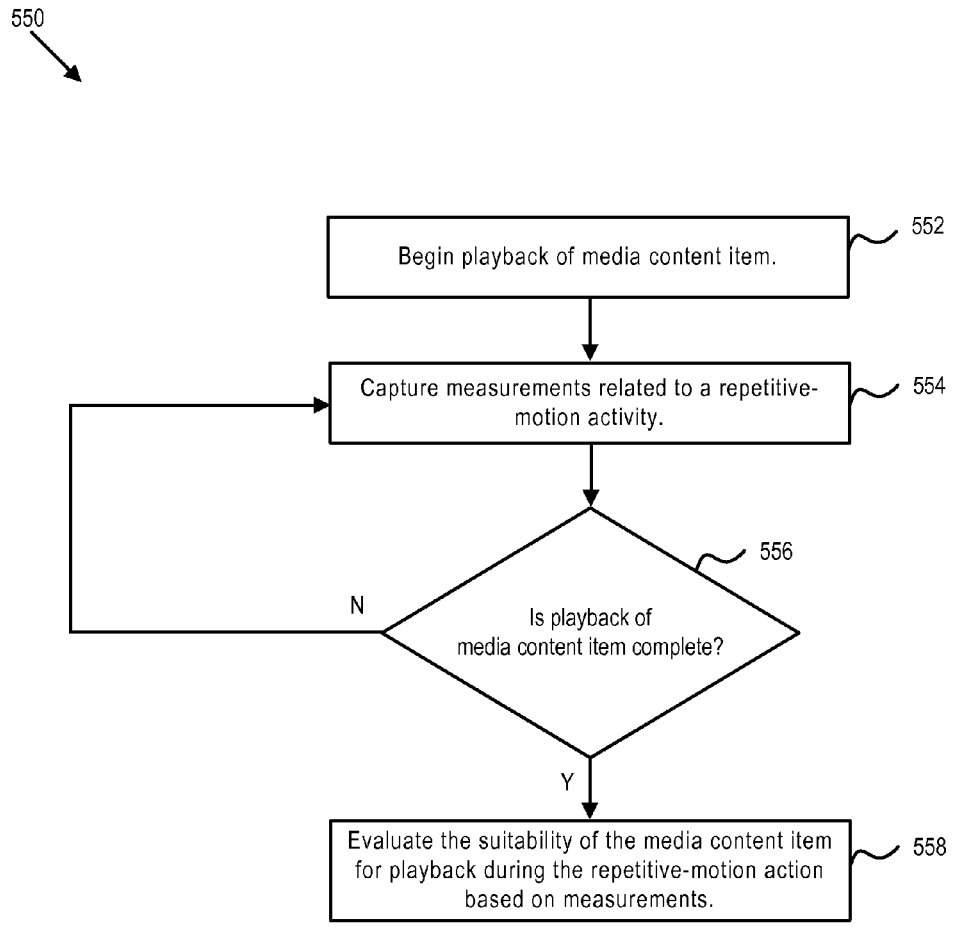
FIG. 16 illustrates an example method of evaluating the suitability of media content items for playback during repetitive-motion activities performed by some embodiments of the enhancement analysis engine of FIG. 3.

FIG. 16 illustrates an example method 550 of evaluating the suitability of media content items for playback during repetitive-motion activities performed by some embodiments of the enhancement analysis engine 252. The method 550 can be used to identify media content items that have positive effects on repetitive-motion activities. The method 550 can also be used to identify media content items that have negative effects on repetitive-motion activities. In some embodiments, the media content items having a positive effect are included in playlists for or played back more frequently during repetitive-motion activities, while the media content items having a negative effect are excluded or played less frequently during repetitive-motion activities. In some embodiments, media-content items are identifies as having a positive or negative effect specifically for particular users or particular activities.

At operation 552, playback of a media content item begins.

At operation 554, measurements related to a repetitive-motion activity are captured. In various embodiments, various measurements are captured. Example measurements include cadence, pace, cadence phase alignment to the media content item, and any of the various physiological measurements discussed herein. Examples of calculating cadence phase alignment to the media content item are provided in U.S. Patent Application Ser. No. 62/163,856, titled CADENCE AND MEDIA CONTENT PHASE ALIGNMENT, filed on May 19, 2015, the entirety of which is hereby incorporated by reference. In some embodiments, pace is calculated from cadence with an estimated or calibrated stride length. Additionally, pace can be calculated using the location determining device.

At operation 556, it is determined whether playback of the media content item is complete. In some embodiments, playback of the media content item is completed based on reaching the end of the media content item. In other embodiments, playback of the media content item is completed based on playback reaching a particular point in the media content item such as a mix-out point. If playback of the media content item is not complete, the method 550 returns to operation 554 to continue monitoring the repetitive motion activity.

If playback of the media content item is complete, the method 550 continues to operation 558, where the suitability of the media content item for playback during the repetitive-motion activity is evaluated based on the measurements. In some embodiments, operation 558 is performed in real time. Additionally, in some embodiments, the operation 558 is performed at some other time such as when the media-playback device 102 is not being used for media playback or when the media-playback device 102 is connected to a power source. Further in some embodiments, the operation 558 is performed by transmitting some or all of the captured measurements to the media-delivery system 104, which then performs the evaluation.

In some embodiments, the suitability of a media content item is calculated based on comparing the captured measurements to target value for the parameter being measured. For example, if the user has indicated a desire to run with a cadence of 180 steps per minute, media content items that were played back while measurements of cadence that are close to 180 steps per minute were captured may be considered to positively affect the repetitive-motion activity. In some embodiments, the media content items are compared to one another to determine which media content items have a greater positive effect on the repetitive-motion activity. Beneficially, this comparative evaluation can be helpful to differentiate the effect of the media content item from the user's underlying performance. Additionally, in some embodiments, measurement taken during multiple separate times the media content item is played back are combined to evaluate the media content item. By considering multiple playback, the effect of environmental factors (e.g., waiting at a stop sign, slowing down to weave in-and-out of other pedestrians, etc.) is minimized. Additionally, in some embodiments, media content items are evaluated based in part on calculating a metric related to how much the measurements change during playback of the media content item (e.g., standard deviation or variance).

Figure 17:
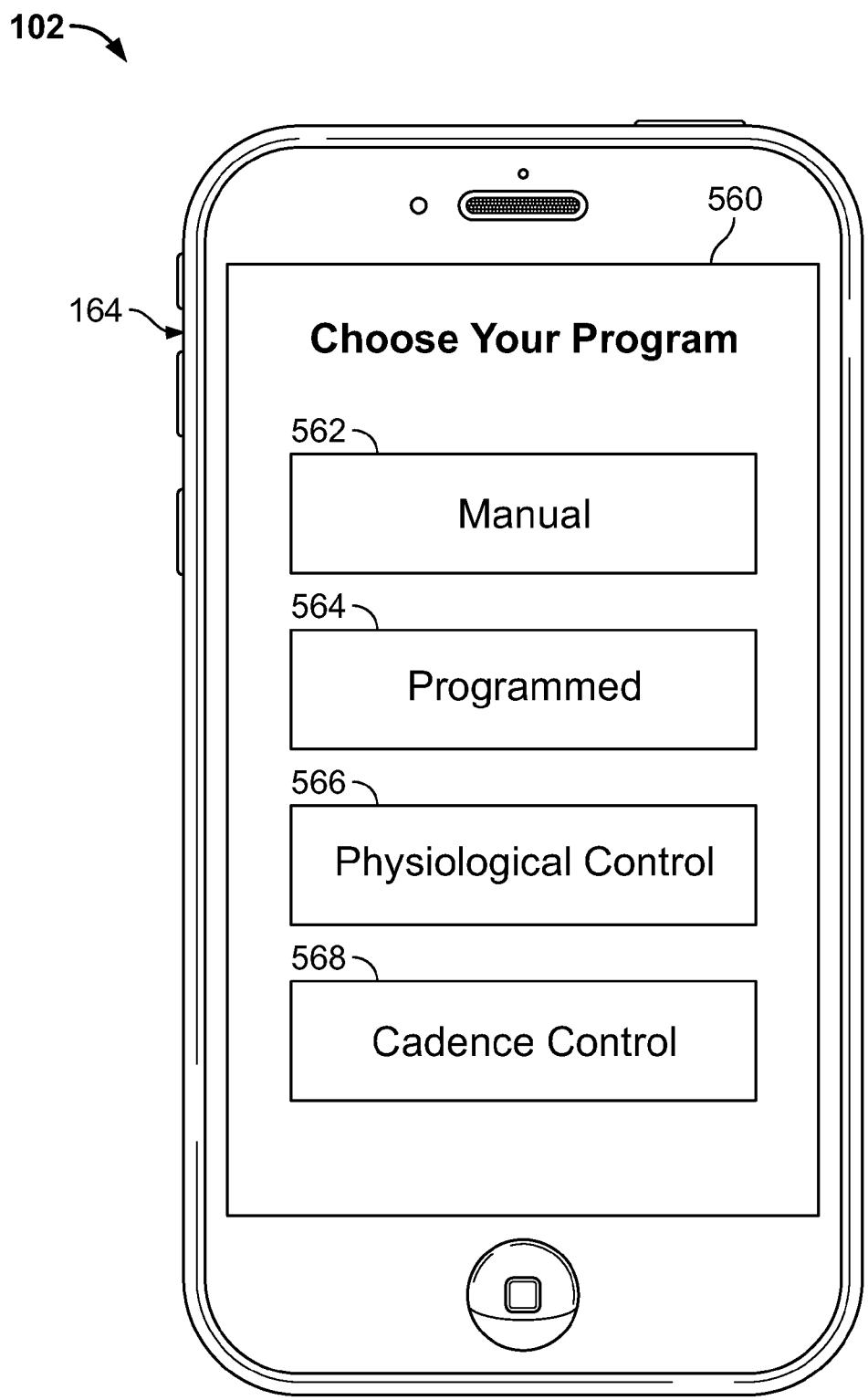
FIG. 17 shows an example mode selection screen displayed by some embodiments of the user interface of FIG. 2.

Referring now to FIG. 17, an example mode selection screen 560 displayed by some embodiments of the user interface 164 of the media-playback device 102 is shown. In some embodiments, the example mode selection screen 560 is displayed when the media-playback device 102 is first activated, when a particular application (or "app") (e.g., the media-playback engine 166) is launched on the media-playback device 102, or upon receiving a particular command (e.g., a menu selection to start the repetitive-motion activity enhancement mode selection engine 240) within an application. The example mode selection screen 560 includes a manual mode input 562, a programmed mode input 564, a physiological control mode input 566, and a cadence control mode input 568. Some embodiments include additional, different, or fewer mode inputs. Each of the mode inputs operates to configure the media-playback device 102 for operation in a specific mode of repetitive-motion activity enhancement. In some embodiments, the manual mode operates as a shortcut to operating in the programmed mode with a program that has only a single segment set to a particular desired cadence or tempo. The other modes are discussed in greater detail elsewhere herein. In some embodiments, the various mode inputs operate to receive a touch input from a selector. In other embodiments, the mode inputs operate to receive user input by other means (e.g., a mouse click, etc.).

Figure 18:
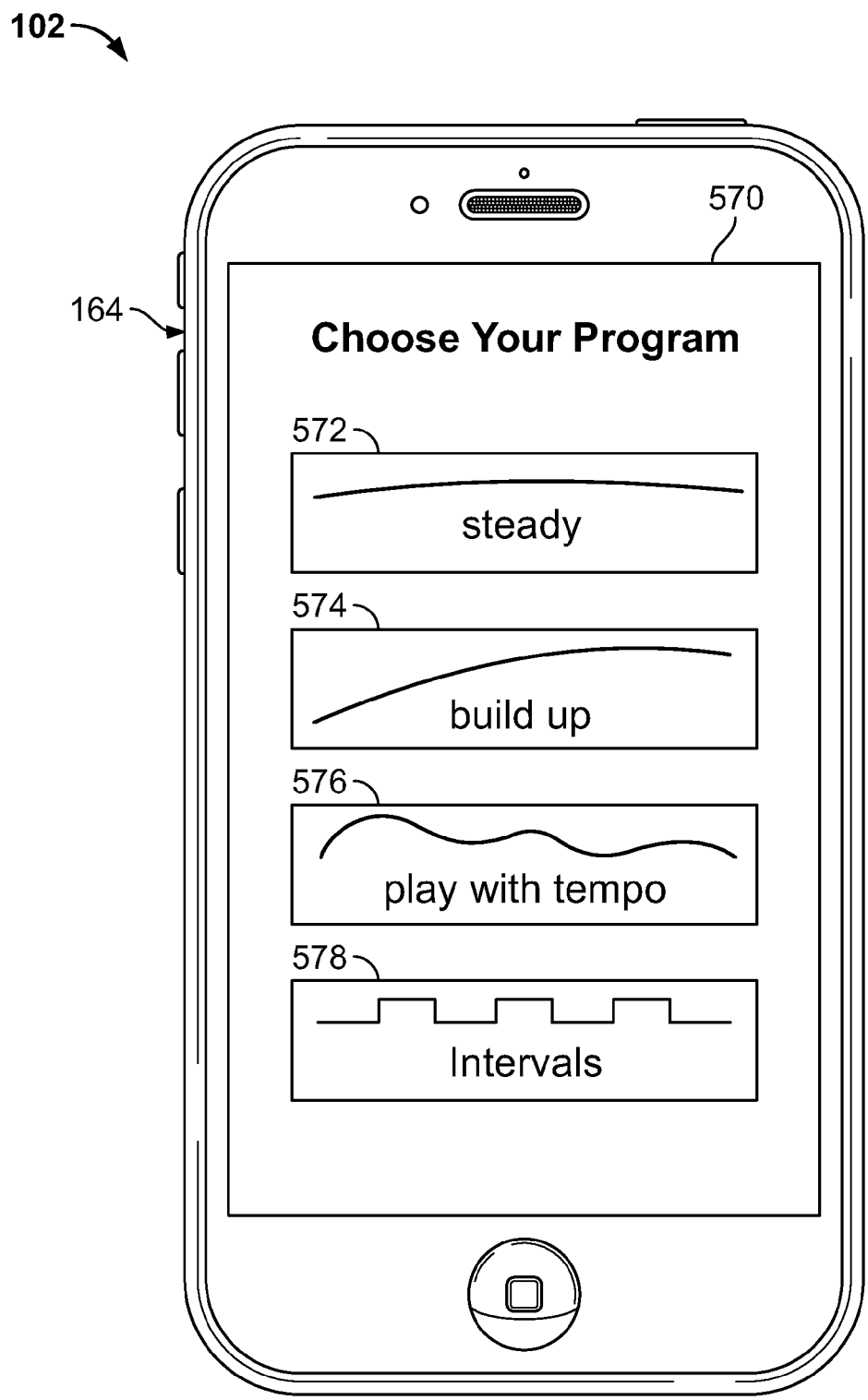
FIG. 18 shows an example program selection screen displayed by some embodiments of the user interface of FIG. 2.

Referring now to FIG. 18, an example program selection screen 570 displayed by some embodiments of the user interface 164 of the media-playback device 102 is shown. In some embodiments, the program selection screen 570 is displayed when the programmed mode of operation is selected. The program selection screen 570 is an example of a mode-specific parameter entry interface.

The program selection screen 570 operates to receive a selection of a particular program, including one or more segments for the repetitive-motion activity. In this example, the program selection screen 570 includes a steady program input 572, a build-up program input 574, a variable program ("play with tempo") input 576, and an intervals program input 578. Other embodiments include additional, different, or fewer programs. In some embodiments, these various program inputs operate to control the target tempo or cadence for the repetitive motion activity. Additionally, some embodiments include an input to configure a program.

Figure 19:
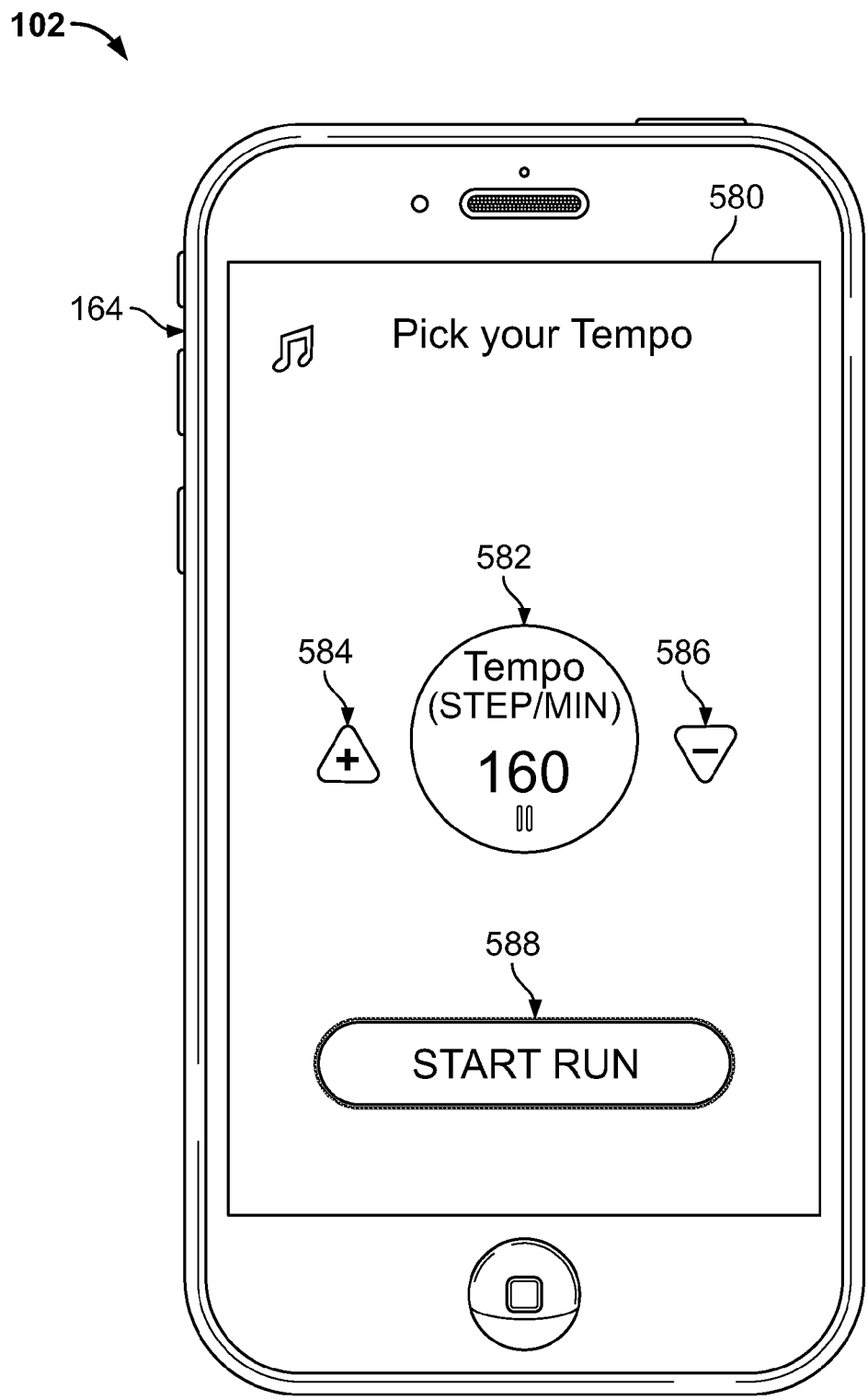
FIG. 19 shows an example tempo selection screen displayed by some embodiments of the user interface of FIG. 2.

Referring now to FIG. 19, an example tempo selection screen 580 displayed by some embodiments of the user interface 164 of the media-playback device 102 is shown. In some embodiments, the tempo selection screen 580 is displayed when the manual mode of operation is selected. The tempo selection screen 580 is another example of a mode-specific parameter entry interface.

In some embodiments, the tempo selection screen 580 includes a current tempo information message 582, an increase tempo control 584, a decrease tempo control 586, and a start activity control 588. The current tempo information message 582 operates to display information about the currently selected tempo setting. The increase tempo control 584 operates to increase the currently selected tempo setting, while the decrease tempo control 596 operates to decrease the currently selected tempo setting. In some embodiments, the increase tempo control 584 and the decrease tempo control 586 operate to respectively increase or decrease the current tempo by an increment of 10 BPM, 5 BPM, 2.5 BPM, 2 BPM, or 1 BPM. Other embodiments use other increments as well. The start activity control 588 operates to receive a user input to indicate that the user is ready to begin running and desires for the media-playback device 102 to begin to playback media content in accordance with the currently selected tempo setting.

Figure 20:
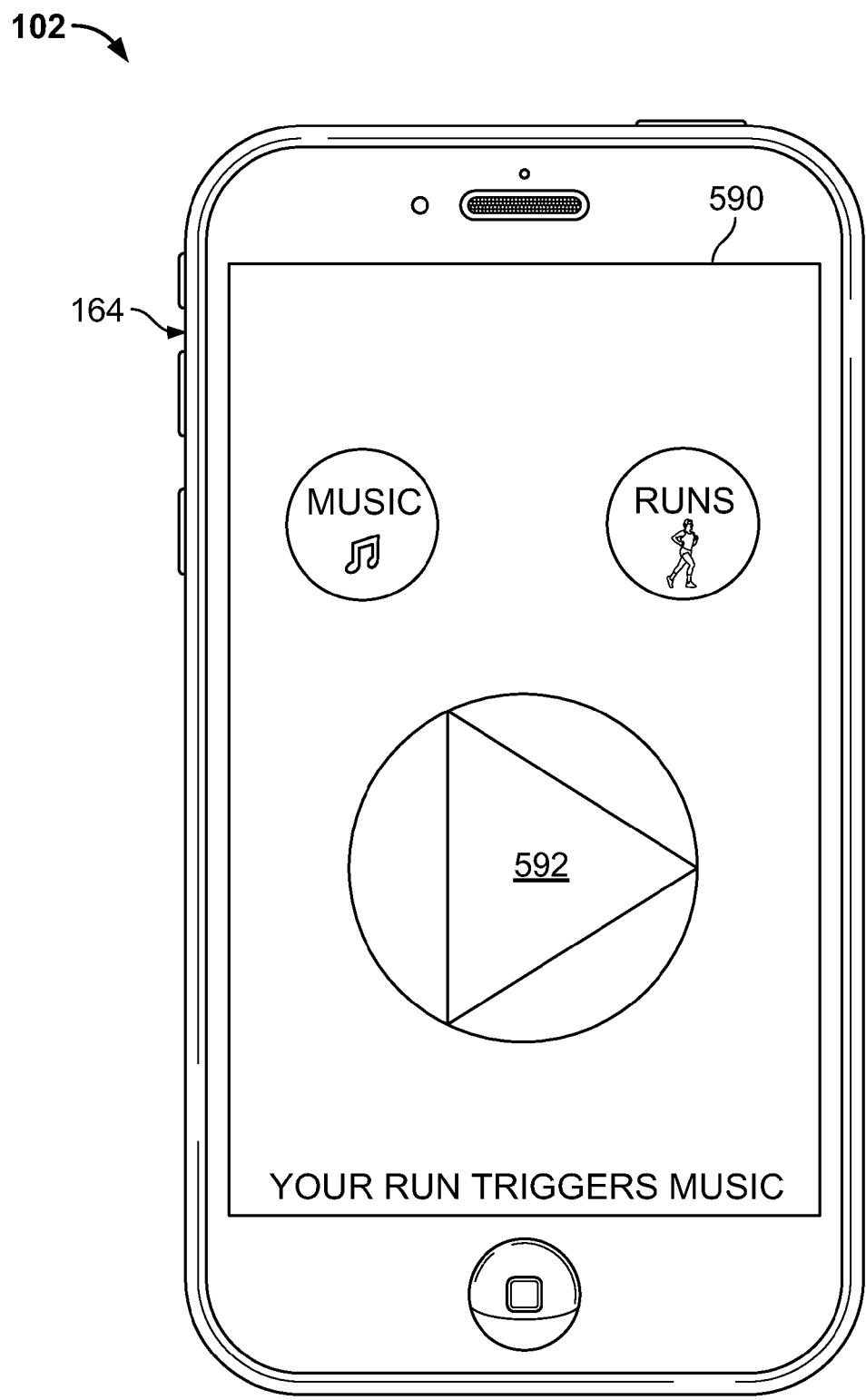
FIG. 20 shows an example start screen displayed by some embodiments of the user interface of FIG. 2.

Referring now to FIG. 20, an example start screen 590 displayed by some embodiments of the user interface 164 of the media-playback device 102 is shown. In some embodiments, the start screen 590 is displayed upon receiving a particular command (e.g., a menu selection of the cadence control mode). The example start screen 590 includes a start control 592. The start control 592 operates to receive a user input to indicate that the user is ready to begin running and desires for the media-playback device 102 to perform one or more of cadence acquisition and cadence-based media selection. In some embodiments, the start control 592 operates to receive a touch input from a selector. In other embodiments, the start control 592 operates to receive user input by other means (e.g., a mouse click, etc.).

Figure 21:
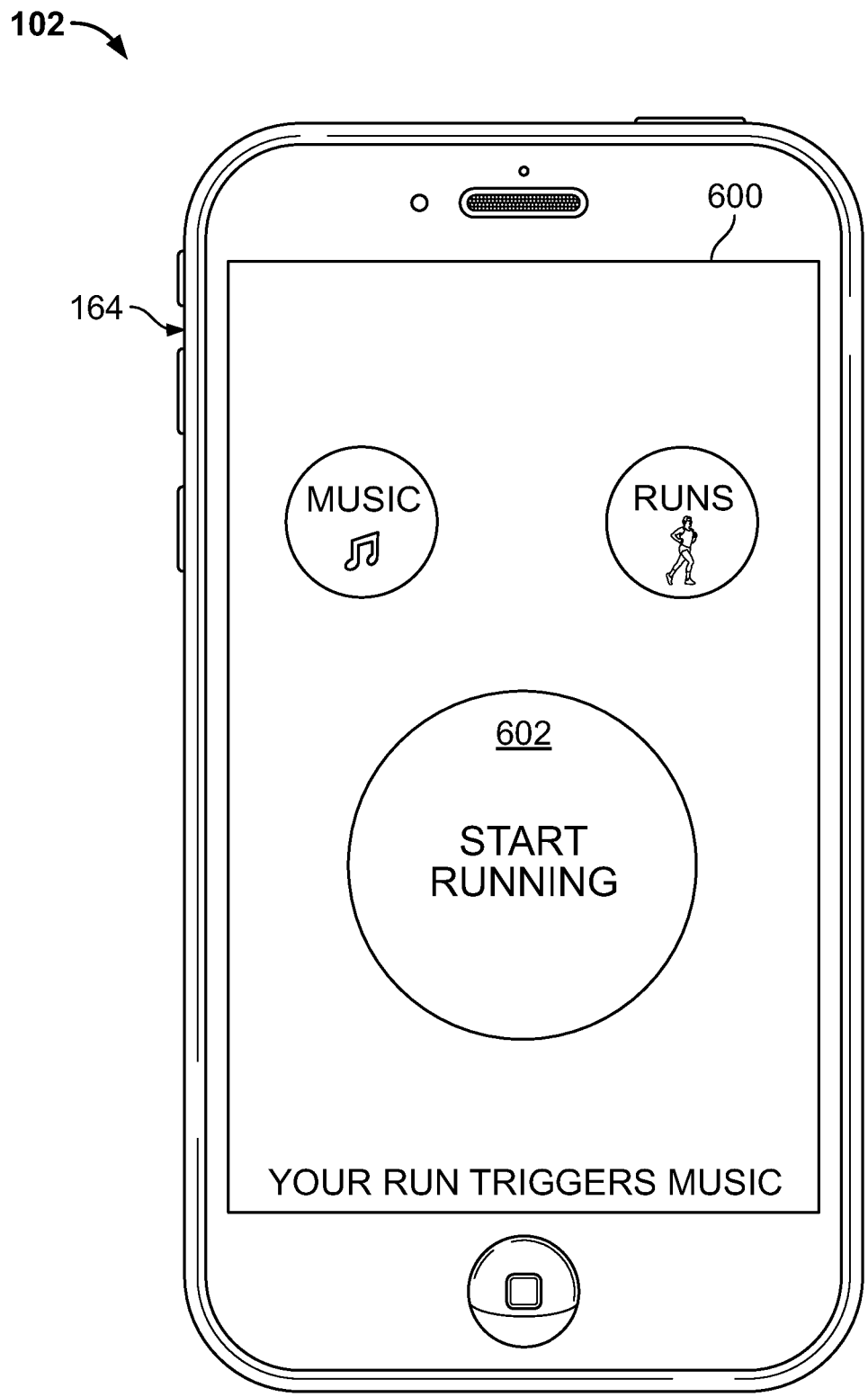
FIG. 21 shows an example start activity screen displayed by some embodiments of the user interface of FIG. 2.

Referring now to FIG. 21, an example start activity screen 600 displayed by some embodiments of the user interface 164 of the media-playback device 102 is shown. In some embodiments, the start activity screen 600 is displayed in response to actuation of the start control 592 and operates to communicate to a user that the media-playback device 102 is ready to perform cadence acquisition. The example start activity screen 600 includes a start activity instruction message 602. In the example shown in FIG. 9, the start activity instruction message 602 includes text that says "START RUNNING." Other embodiments are possible that show other instruction messages. Further, some embodiments of the start activity instruction message 602 include icons, images, video clips, etc. to communicate various information or instructions to the user. In some embodiments, the cadence-acquiring device 160 continuously attempts to acquire a cadence while the start activity screen 600 is being displayed.

Figure 22:
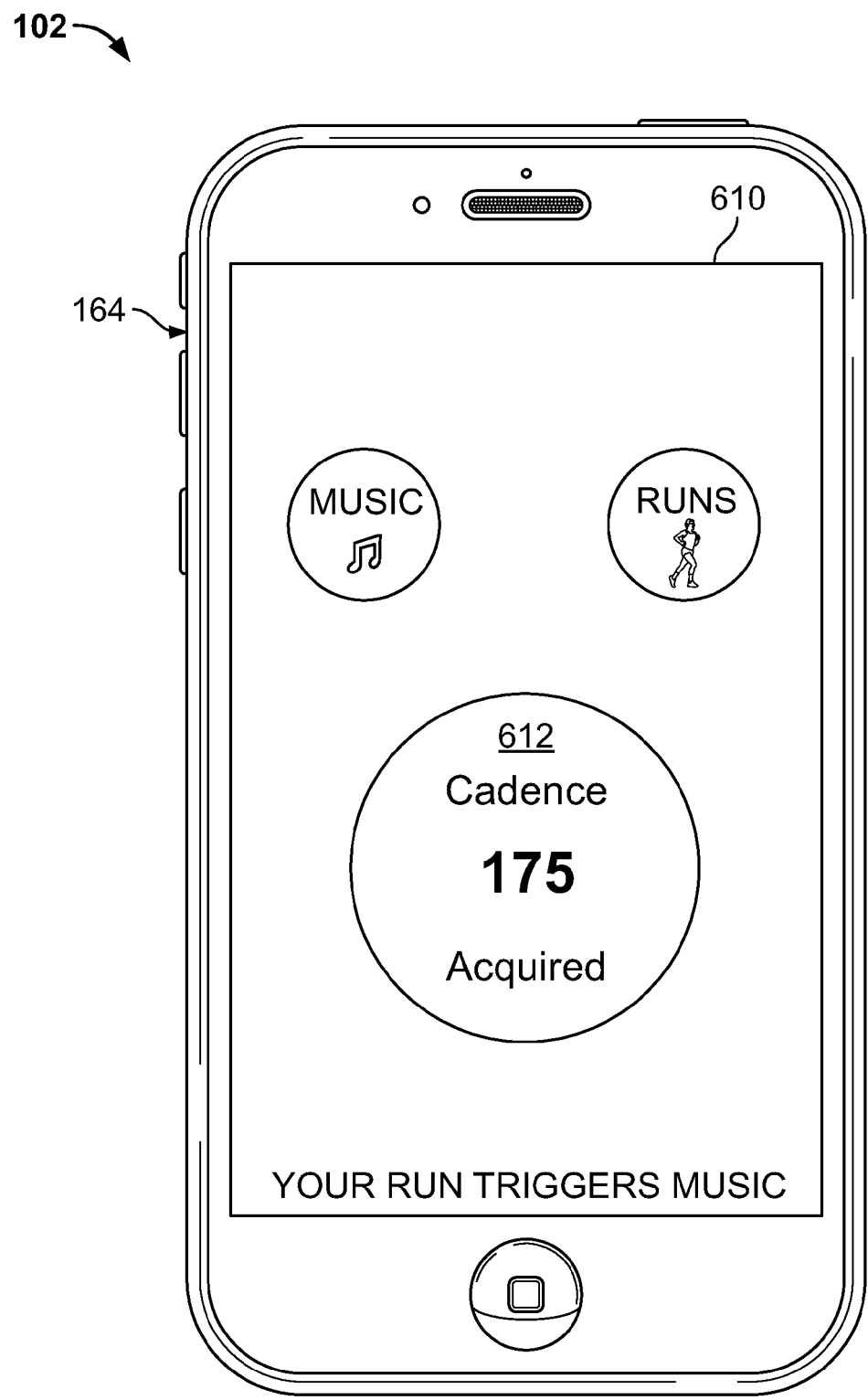
FIG. 22 shows an example cadence acquired screen displayed by some embodiments of the user interface of FIG. 2.

Referring now to FIG. 22, an example cadence acquired screen 610 displayed by some embodiments of the user interface 164 of the media-playback device 102 is shown. In some embodiments, the cadence acquired screen 610 is displayed after the media-playback device 102 has successfully performed an initial cadence acquisition. The example cadence acquired screen 610 includes a cadence acquired message 612. In some embodiments, the cadence acquired message 612 includes text to indicate that a cadence value has been acquired (e.g., "CADENCE ACQUIRED"). Additionally, in some embodiments, the cadence acquired message 612 includes text to indicate the cadence value that was acquired (e.g., 175 steps per minute in the example shown in FIG. 22). In some embodiments, the cadence acquired screen 610 is displayed only briefly or not at all. For example, a cadence-based content playback screen (such as the example illustrated and described with respect to at least FIG. 23) is shown instead of the cadence acquired screen 610 or shortly after the cadence acquired screen 610 is displayed.

Figure 23:
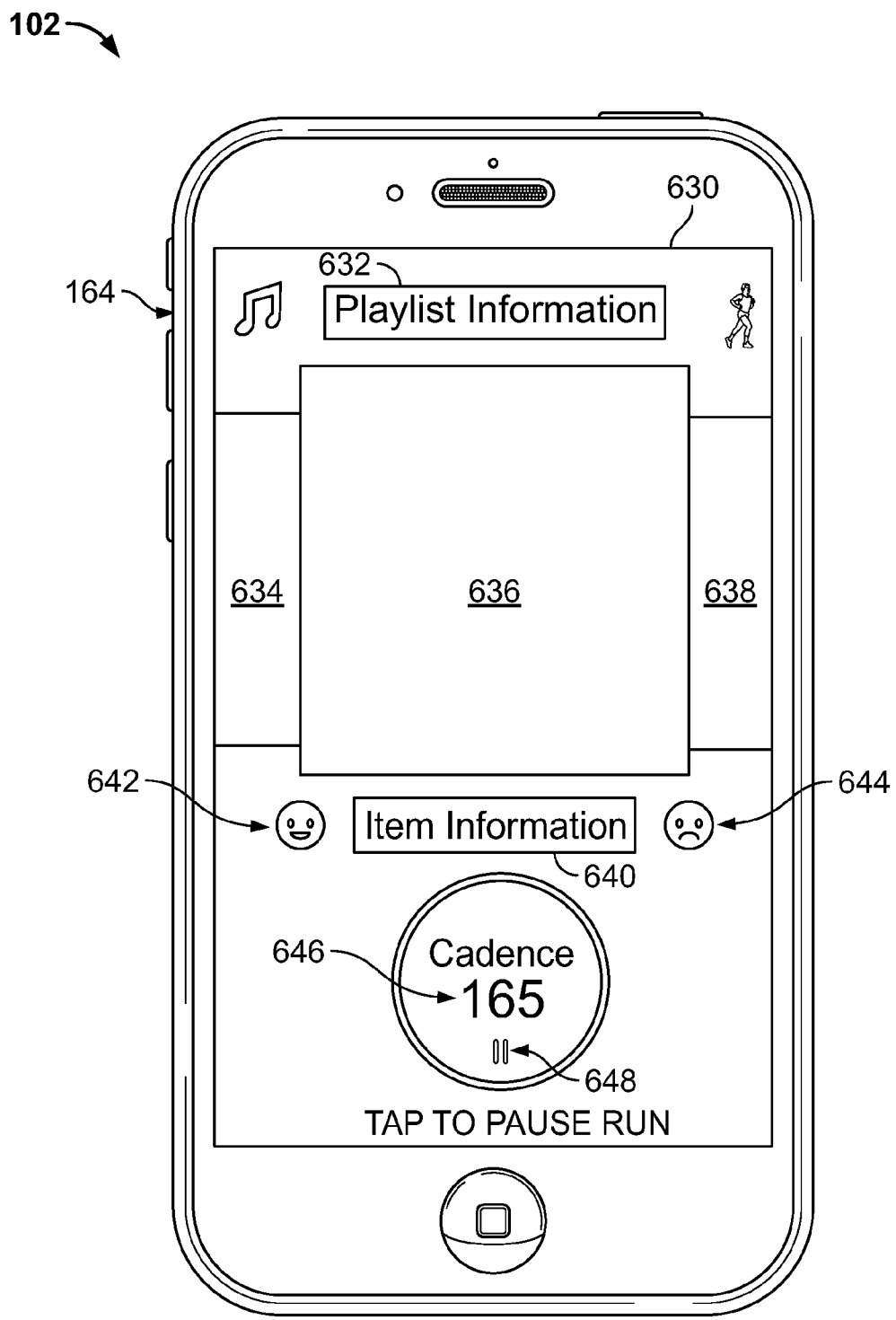
FIG. 23 shows an example cadence-based content playback screen displayed by some embodiments of the user interface of FIG. 2.

Referring now to FIG. 23, an example cadence-based content playback screen 630 displayed by some embodiments of the user interface 164 of the media-playback device 102 is shown. In some embodiments, the cadence-based content playback screen 630 is displayed in response to acquiring a cadence associated with a user activity. In some embodiments, the cadence-based content playback screen 630 includes a playlist information message 632, a previous media content item display panel 634, a current media content item display panel 636, a next media content item display panel 638, a current media content item information message 640, a dislike control 642, a like control 644, a cadence information message 646, and a pause control 648.

The playlist information message 632 operates to display information about the currently playing playlist of media content items. The playlist may be a pre-defined playlist of media content items that correspond to an acquired cadence or an ad-hoc playlist generated by the media-playback device 102 or the media-delivery system 104 based on the acquired cadence. In some embodiments, the playlist information message 632 displays a title provided with a pre-defined playlist (e.g. "Outdoor Running," "Spin Class," "Peak Performance," etc.). In some embodiments, the playlist information message 632 displays information that relates to the media content items included in an ad-hoc playlist such as a region (e.g., Sweden, Europe, U.S., etc.), a genre (e.g., Country, Rock, Rap, etc.), a mood (e.g., calm, happy, etc.), an era (e.g., 70's, 80's, 90's, 00's, etc.), or popularity (e.g., Top 50, etc.).

The previous media content item display panel 634 operates to display information about the previously played media content item such as an image associated with the previously played media content item (e.g., an album cover, an artist photograph, etc.). The current media content item display panel 636 and the next media content item display panel 638 operate similarly with respect to the currently playing media content item and the media content item that is schedule to play next. In some embodiments, the user interface 164 operates to cause the next or previous media content item to begin playback in response to detecting a swipe input to the left or right over the current media content item display panel 636. Additionally, in some embodiments, the user interface 164 operates to cause the previously played media content item to begin playback in response to detecting a touch input on the previous media content item display panel 634. Similarly, in some embodiments, the user interface 164 operates to cause the next media content item to begin playback in response to detecting a touch input on the next media content item display panel 638.

The current media content item information message 640 operates to display information about the currently playing media content item. Some embodiments display one or more of the following: a title, an artist name, an album name, a current position, a total length, and a tempo.

The dislike control 642 and the like control 644 operate to receive inputs indicating that a user dislikes or likes the currently playing media content item. In some embodiments, the media-playback device stores a like/dislike value associated with the currently playing media content item upon actuation of either the dislike control 642 or the like control 644. The value may be stored locally on the media-playback device 102 or remotely on the media-delivery system 104 or elsewhere. In some embodiments, one or both of the media-playback device 102 and the media-delivery system 104 use the like/dislike values that have been previously stored in selecting media content items for future playback. Additionally, in at least some embodiments, upon actuation of the dislike control 642, the currently playing media content item stops playing immediately or after a period of time and a new media content item begins to play.

The cadence information message 646 operates to present information to the user about the acquired cadence. In some embodiments, the cadence information message 646 displays a numeric value representing the acquired cadence. Additionally, in some embodiments, the cadence information message 646 also presents information related to whether the acquired cadence has recently changed. For example, the cadence information message 646 may include an arrow pointing up if the acquired cadence has recently increased and an arrow pointing down if the acquired cadence has recently decreased. Alternatively, the cadence may be displayed in a first color to indicate a recent increase, a second color to indicate a recent decrease, and a third color to indicate a stable cadence. As yet another alternative, the cadence information message 646 may blink or otherwise indicate the occurrence of a recent change in cadence. In yet another embodiment, the cadence information message 646 may operate to indicate how a currently acquired cadence compares to a goal or target cadence using any of the previously mentioned visual indicators. Additionally, in some embodiments, the cadence information message 646 operates to indicate if the media-playback device 102 has been unable to acquire a cadence valued (e.g., an error has occurred, the user is no longer running, etc.).

The pause control 648 operates to receive a pause input from the user. In some embodiments, the pause input triggers the media-playback device 102 to pause cadence acquisition. Beneficially, by pausing cadence acquisition, the user can take a break or otherwise change cadence without causing the playback of media content items to change. Users may take break for many reasons, such as to rest/recover, to wait to safely cross an intersection, or to wait for a running partner. Users may temporarily change cadence for many reasons as well such as to climb a stair case or a big hill, to cross rugged terrain, to weave through heavy traffic, etc. Additionally, in some embodiments, the pause input also triggers the media-playback device 102 to pause playback of the media content items.

Figure 24:
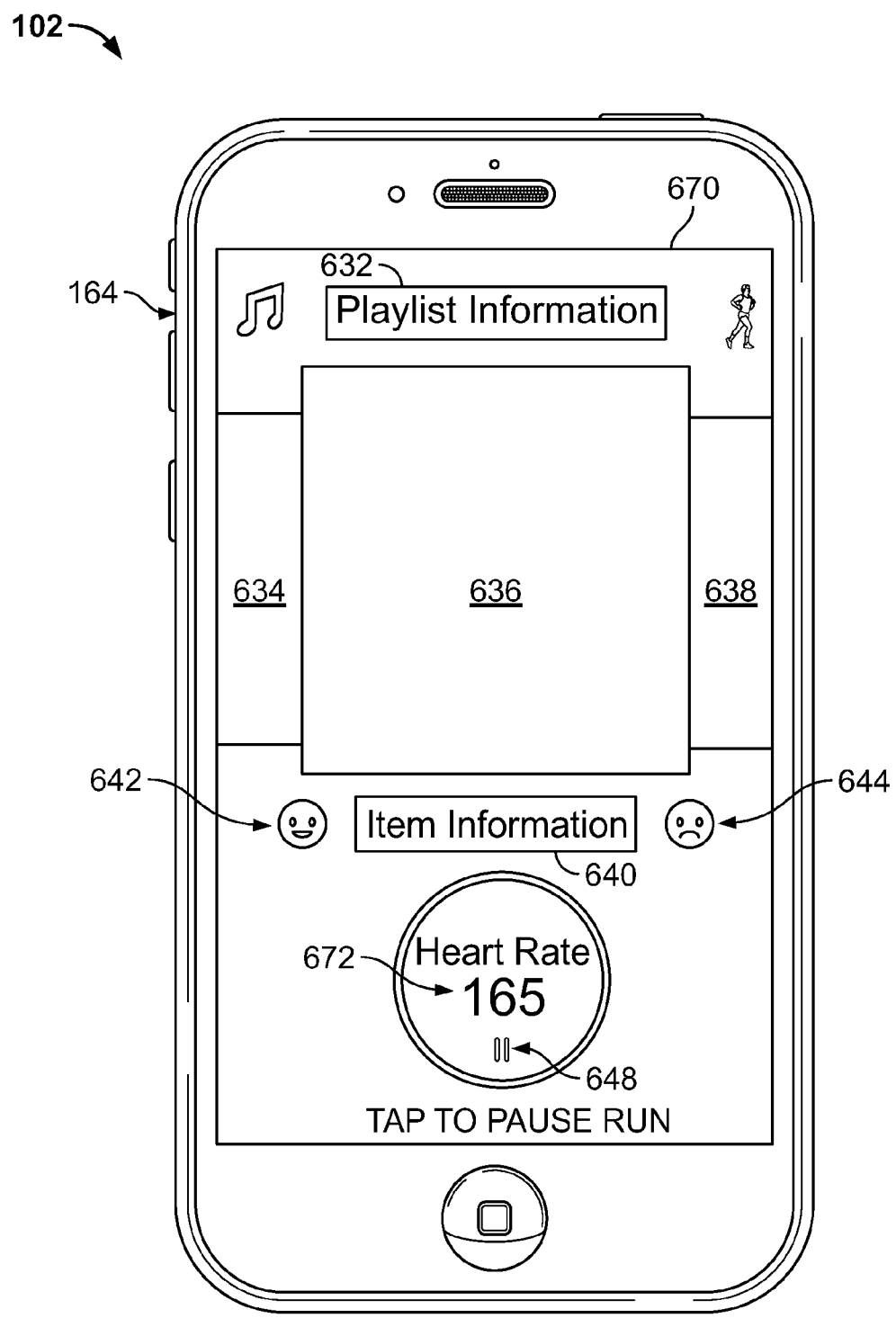
FIG. 24 shows an example heart rate-based content playback screen displayed by some embodiments of the user interface of FIG. 2.

Referring now to FIG. 24, an example heart rate-based content playback screen 670 displayed by some embodiments of the user interface 164 of the media-playback device 102 is shown. In some embodiments, the heart rate-based content playback screen 400 is displayed in response to acquiring a heart rate of the user U associated with a user activity such as when the media-playback device 102 is operating in a physiological control mode.

In some embodiments, the heart rate-based content playback screen 670 is similar to the example cadence-based content playback screen 630. In the example shown in FIG. 24, the heart rate-based content playback screen 670 is the same as the example cadence-based content playback screen 630 except that the cadence information message 646 is replaced with a heart rate information message 672. The heart rate information message 672 is similar to the cadence information message 646 except that it operates to present information to the user about the acquired heart rate rather than about a cadence. The heart rate information message 672 is an example of displaying a physiological measurement. In some embodiments, additional or different physiological measurements are displayed as well. Additionally, some embodiments include interface screens that display both the heart rate information message 672 and the cadence information message 646.

Figure 25:
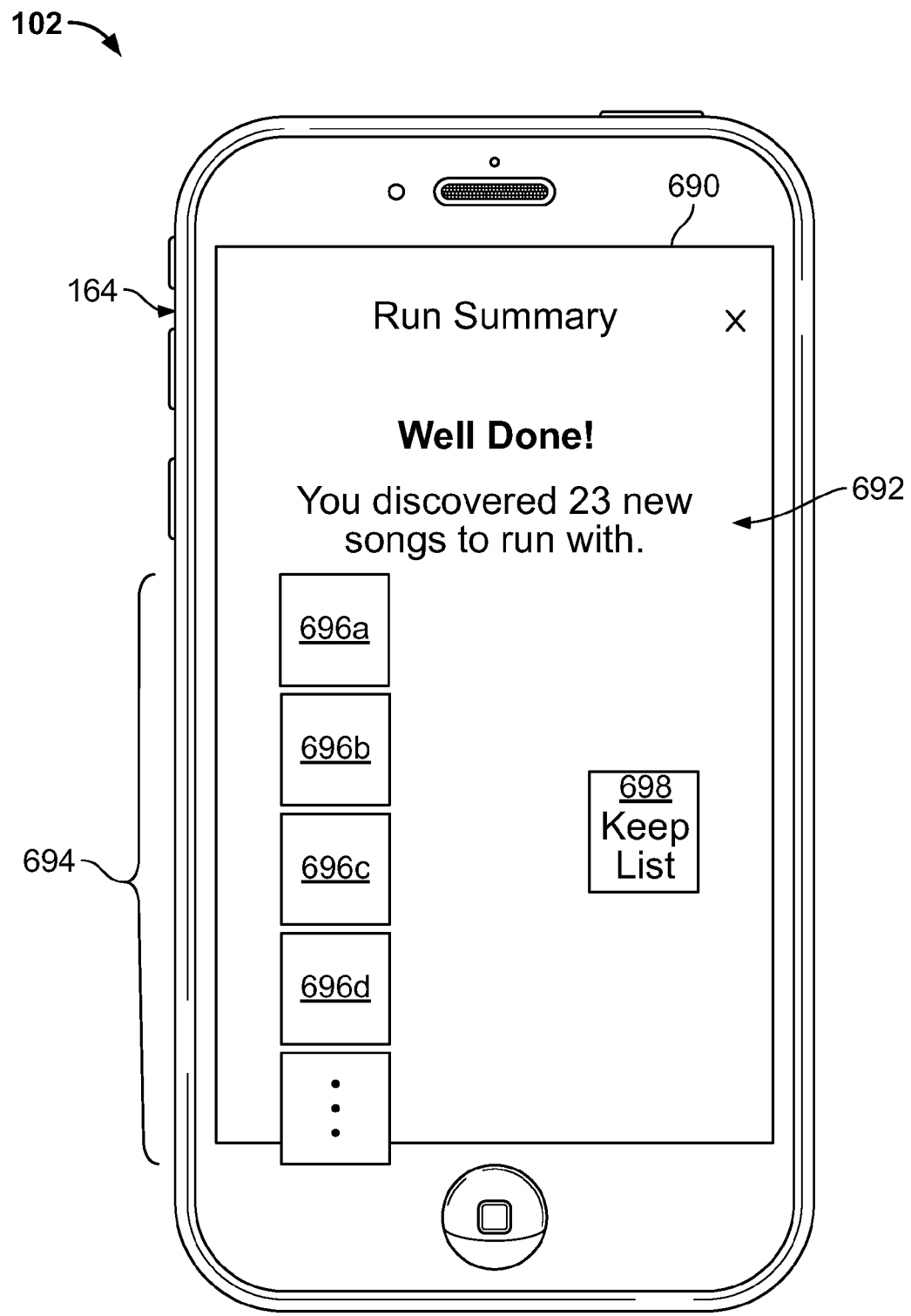
FIG. 25 shows an example repetitive-motion activity summary screen displayed by some embodiments of the user interface of FIG. 2.

Referring now to FIG. 25, an example repetitive-motion activity summary screen 690 displayed by some embodiments of the user interface 164 of the media-playback device 102 is shown. In some embodiments, the repetitive-motion activity summary screen 690 is displayed after a repetitive motion activity is completed. The example repetitive-motion activity summary screen 690 includes a activity summary message 692. In some embodiments, the activity summary message 692 includes a number of media content items that were played back during the activity.

Additionally, in some embodiments, the repetitive-motion activity summary screen 690 includes a list 694 of media content items that were played back during the run. For example, in the example of FIG. 25 the list 694 includes the media content item display panels 696a, 696b, 696c, and 696d. In some embodiments, a media content item display panel is displayed (or available via scrolling, etc.) for each media content item that was played back during the repetitive motion activity. In some embodiments, the media content display panels operate to both display information and receive user inputs. For example, in some embodiments actuating (touching, clicking on, etc.) one of the media content item display panels allows a user to replay a media content item, add the media content item to a new playlist, remove the media content item from the repetitive-motion activity summary, or block the media content item from play back during future repetitive-motion activities.

Additionally, some embodiments include a keep list input 698. Upon actuation, the keep list input 698 operates to store the list 694 of media content items being displayed. Beneficially, a user may use the stored playlist in future repetitive-motion activities.

As noted previously, although many of the examples provided above are described with respect to running, other embodiments relate to other repetitive motion activities as well such as cycling, swimming, and rowing.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A media-playback device for enhancement of a repetitive-motion activity, the media playback device comprising:
    a media-output device that plays media content items;
    a processing device; and
    a computer readable data storage device storing data instructions that, when executed by the processing device, cause the processing device to:
        determine a media playback mode among a plurality of media playback modes, the plurality of media playback modes including a cadence-based media playback mode and a repetitive-activity enhancement playback mode;
        when the determined media playback mode is the cadence-based media playback mode:
            determine a cadence associated with the repetitive-motion activity, wherein the cadence is determined using a predetermined threshold and a predetermined duration to distinguish an intentional change in cadence from an environment-based change in cadence; and
            upon determining the cadence associated with the repetitive-motion activity, generate an audible cadence acquired indicator and select media content items based on the cadence associated with the repetitive-motion activity;
        when the determined media playback mode is the repetitive-activity enhancement playback mode, select media content items according to an enhancement program for the repetitive-motion activity;
        playback media content items selected according to the determined media playback mode, wherein the selection of media content items is based on a tempo value and repetitive-motion activity score, the repetitive-motion activity score corresponding to suitability of a media content item for playback during the repetitive-motion activity;
        monitor performance of the repetitive-motion activity during playback of the selected media content items to evaluate the suitability of at least one of the media content items for playback during the repetitive-motion activity in the future;
        select a media content item to provide an enhancement booster for the repetitive-motion activity based upon monitoring the repetitive-motion activity;
        determine a delay for playing back the enhancement booster; and
        play back the enhancement booster after the delay.

2. The media-playback device of claim 1, further comprising a cadence-acquiring device comprising an accelerometer and further data instructions that cause the processing device to determine a cadence based on acceleration data captured by the accelerometer.

3. The media-playback device of claim 1, comprising further data instructions that cause the processing device to align consecutive playback of a first media content item and a second media content item.

4. The media-playback device of claim 3, wherein the data instructions that cause the processing device to align consecutive playback further cause the processing device to:
    determine an alignment beat in the first media content item;

determine a starting beat in the second media content item; and cause the second media content item to begin playback such that the starting beat is aligned with the alignment beat.

5. The media-playback device of claim 4, wherein the alignment beat is a downbeat and the starting beat is a downbeat.

6. The media playback device of claim 1, further comprising data instructions that cause the processing device to select media content items based on a physiological measurement.

7. The media playback device of claim 1, wherein the physiological measure is a heart rate.

8. The media-playback device of claim 1, wherein the enhancement program is a single segment identifying a tempo value for media content playback.

9. The media-playback device of claim 8, wherein the tempo value is identified based on a target cadence.

10. The media-playback device of claim 1, wherein the enhancement program comprises a plurality of segments.

11. The media-playback device of claim 1, wherein the data instructions that cause the processing device to select media content items based on a cadence further cause the processing device to:
monitor for changes in the cadence associated with the repetitive-motion activity; and
upon detecting a change in cadence:
identify a second media content item based on a changed cadence; and
cause the media-output device to playback the identified second media content item.

12. The media-playback device of claim 1, wherein the media content item is streamed to the media-playback device by a media-delivery system based on a request for media content items that specifies the cadence.

13. The media-playback device of claim 1, wherein the media playback device is a watch.

14. The media-playback device of claim 1, wherein the media playback device is a smartphone including the processing device and the computer-readable data storage device.

15. A method of selecting media content to enhance a repetitive-motion activity according to an enhancement program comprising:
selecting a media content item for playback based on a tempo defined by a first segment of the enhancement program and based on repetitive-motion activity score, the repetitive-motion activity score corresponding to suitability of a media content item for playback during the repetitive-motion activity;
determining a cadence associated with the repetitive-motion activity, wherein the cadence is determined using a predetermined threshold and a predetermined duration to distinguish an intentional change in cadence from an environment-based change in cadence;
upon determining the cadence associated with the repetitive-motion activity, generating an audible cadence acquired indicator;
monitoring the repetitive-motion activity to determine whether the first segment is complete and to evaluate the suitability of the selected media content item for playback during the repetitive-motion activity in the future;
upon determining that the first segment is complete, selecting a second media content item for playback based on a tempo defined by a second segment of the enhancement program and based on the repetitive-motion activity score;
selecting a media content item to provide an enhancement booster for the repetitive-motion activity based upon monitoring the repetitive-motion activity;
determining a delay for playing back the enhancement booster; and
playing back the enhancement booster after the delay.

16. The method of claim 15, wherein the first segment is determined to be complete based on a duration of time specified for the first segment.

17. The method of claim 15, wherein the first segment is determined to be complete based on a physiological measurement captured during the repetitive-motion activity.

18. A mobile device for enhancement of a repetitive-motion activity, the mobile device comprising:
a media-output device that plays media content items;
a cadence-acquiring device comprising an accelerometer and configured to determine a cadence based on acceleration data captured by the accelerometer;
a processing device; and
a computer readable data storage device storing data instructions that, when executed by the processing device, cause the processing device to:
determine a media playback mode among a plurality of media playback modes, the plurality of media playback modes including a cadence-based media playback mode, a repetitive-activity enhancement playback mode, and a physiological control playback mode;
when the determined media playback mode is the cadence-based media playback mode:
determine, by the cadence-acquiring device, a cadence associated with the repetitive-motion activity, wherein the cadence is determined using a predetermined threshold and a predetermined duration to distinguish an intentional change in cadence from an environment-based change in cadence; and
upon determining the cadence associated with the repetitive-motion activity, generate a voiceover indicator of the determined cadence and select media content items based on the cadence;
when the determined media playback mode is the repetitive-activity enhancement playback mode, select media content items according to an enhancement program for the repetitive-motion activity;
when the determined media playback mode is the physiological control playback mode, select media content items based on a physiological measurement;
playback media content items selected according to the determined media playback mode with the media-output device, wherein the selection of media content items is based on a tempo value and repetitive-motion activity score, the repetitive-motion activity score corresponding to suitability of a media content item for playback during the repetitive-motion activity;
select a media content item to provide an enhancement booster for the repetitive-motion activity based upon monitoring the repetitive-motion activity;
determine a delay for playing back the enhancement booster;
play back the enhancement booster after the delay;
align consecutive playback of media content items; and monitor performance of the repetitive-motion activity during playback of the selected media content items to evaluate the suitability of at least one of the media content items for playback during the repetitive-motion activity in the future.

19. The media-playback device of claim 1, wherein an intentional change in cadence is determined based on a combination of a difference between an acquired cadence and a current cadence and a duration of the difference.

20. The media-playback device of claim 1, further comprising an altimeter for acquiring altitude measurements, and wherein changes in cadence that occur while the altitude measurements are changing rapidly are ignored.

21. The media-playback device of claim 1, further comprising data instructions that cause the processing device to:
   monitor performance of the repetitive-motion activity during playback of the enhancement booster; and
   calculate an enhancement effectiveness score for the enhancement booster representative of a suitability of the enhancement booster for future playback during the repetitive-motion activity.

22. The media-playback device of claim 1, wherein the delay is calculated to allow the playback of a media content item to complete.

\* \* \* \* \*